DIRECTIONAL CONFERENCE SYSTEM

INVENTORS W. J. McKELVEY
M. E. OZENBERGER
BY
R. C. Winter
ATTORNEY

Jan. 31, 1967 W. J. McKELVEY ETAL 3,301,962

DIRECTIONAL CONFERENCE SYSTEM

Filed April 29, 1963 17 Sheets-Sheet 2

Jan. 31, 1967 W. J. McKELVEY ETAL 3,301,962

DIRECTIONAL CONFERENCE SYSTEM

Filed April 29, 1963 17 Sheets-Sheet 6

DIRECTIONAL CONFERENCE SYSTEM

Filed April 29, 1963 17 Sheets-Sheet 7

Jan. 31, 1967 W. J. McKELVEY ETAL 3,301,962

DIRECTIONAL CONFERENCE SYSTEM

Filed April 29, 1963 17 Sheets-Sheet 10

Jan. 31, 1967 W. J. McKELVEY ETAL 3,301,962

DIRECTIONAL CONFERENCE SYSTEM

Filed April 29, 1963 17 Sheets-Sheet 11

Jan. 31, 1967 W. J. McKELVEY ETAL 3,301,962

DIRECTIONAL CONFERENCE SYSTEM

Filed April 29, 1963 17 Sheets-Sheet 12

Jan. 31, 1967 W. J. McKELVEY ET AL 3,301,962

DIRECTIONAL CONFERENCE SYSTEM

Filed April 29, 1963 17 Sheets-Sheet 14

United States Patent Office 3,301,962

Patented Jan. 31, 1967

3,301,962
DIRECTIONAL CONFERENCE SYSTEM

William J. McKelvey, Middletown, and Milton E. Ozenberger, Summit, N.J., assignors to Bell Telephone Laboratories, Incorporated, New York, N.Y., a corporation of New York Filed Apr. 29, 1963, Ser. No. 276,544
20 Claims. (Cl. 179—18)

Figure 1:
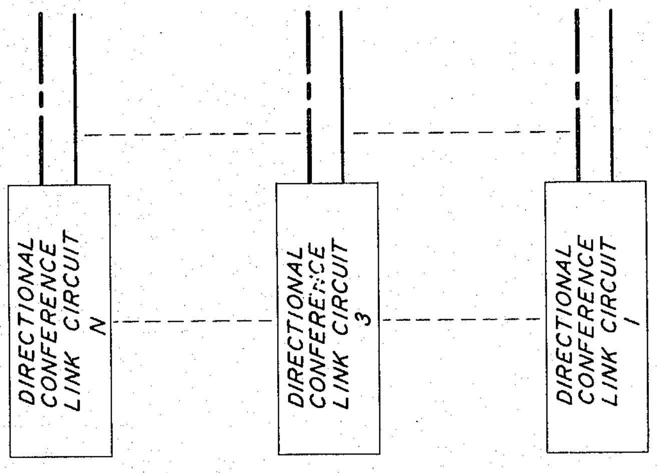

This invention relates generally to telephone systems and particularly to telephone conference equipment within such systems. More particularly, this invention relates to conference equipment arranged to provide directional communication between a principal line and a plurality of subordinate lines, to the exclusion of communication between such subordinate lines, via an automatically controlled switching array which is operable to connect any line to such conference equipment in either a main or subordinate capacity.

Extensive development and improvement of telephone switching systems in recent years have led to an ever increasing demand by telephone subscribers for additional features which render their telephone service more convenient and more flexible. For example, conference arrangements have been provided in the past to enable simultaneous communication by a number of stations with each other. So-called broadcast systems have also been provided in the past which enable communication from a central point to a number of subordinate points under control of a main station. The above-referred to conference arrangements have the limitation that communication is multidirectional and thus, from that standpoint, is not under control of any one station, coupled with the fact that ensuing conversation is heard by all parties to the conference. On the other hand, broadcast systems have the disadvantage that while providing directional communication, such communication is not effective bidirectionally with respect to all stations simultaneously and therefore is not of a conference nature. Further, in the latter case, the main or controlling station is restricted to a single physical location and special equipment is required on the parties' premises which is utilized relatively infrequently.

Therefore, a situation prevails where, in order for a called party's conversation to be secret with respect to other called parties, successive, separate and individual calls must be established to each such party involved. The prior art does not provide for an arrangement wherein a calling party may converse simultaneously with a number of called parties and yet have the called parties' responses inaudible to each other. Thus, no provision has been made for situations where it is necessary for a party who is not at a fixed location to completely dominate a conference connection as, for example, in the case of an emergency alerting system, or in a case where a calling party desires to simultaneously elicit secret bids from a number of called parties for a business contact.

In view of the foregoing, an object of this invention is to provide a centralized directional conference arrangement which is readily accessible to serve all lines desiring such conference service.

A further object is to provide a directional conference circuit which is of an extremely simple and economical construction.

A further object is to provide a directional conference circuit to which all lines have access either in a main or subordinate capacity.

A still further object is to provide an efficient switching array for connecting lines via trunk circuits to directional conference circuits in such fashion as to utilize all such trunk circuits and directional conference circuits to their maximum capacity.

These and other objects are attained in accordance with an exemplary embodiment of the invention wherein directional conference link circuits are terminated on the horizontal rows of a crossbar switch field and four-wire trunk circuits are terminated on the vertical columns of the same crossbar switch field. The crossbar switches employed in the embodiment are of the type well known in the art and may be similar in construction to those set forth in the A. J. Busch Patent No. 2,585,904 issued February 19, 1952. An operator console is also provided and arranged with pushbutton keys to control the connection of the trunks to the conference links.

Each conference link comprises a main or controlling terminal and a plurality of subordinate terminals. Each main terminal is connected to a specific horizontal row which is multiplied across the crossbar switch field thereby providing access for all trunks to that main terminal. The subordinate terminals of each link are associated with another horizontal row in a nonmultiple fashion wherein each such terminal is individually connectable through a crosspoint associated with each trunk vertical thereby providing access individually for each trunk to a corresponding conference link subordinate terminal.

At the operator console, lamps associated with each trunk are provided to alert the operator to a service request. Each trunk is also provided with two nonlocking keys to enable the operator to associate each trunk with a conference link via either a main terminal or a subordinate terminal. Operation of the appropriate key activates a controller circuit so as to cause the closure of the corresponding crosspoints thereby connecting the associated trunk to the desired main or subordinate terminal of an available conference link. The operator console is further provided with apparatus which enables the operator to selectively add each called party via a trunk to a subordinate terminal of the conference link.

Within each conference link circuit, one transmitting amplifier and one receiving amplifier are provided, and each is connected through distributing resistor circuits to the subordinate terminals. Communication is effective from a trunk connected to the main terminal forward to all trunks connected to the subordinate terminals, while communication from trunks connected to the subordinate terminals is effective only toward the trunk connected to the main terminal.

Electrical control of the conference is provided to the trunk connected to the main terminal, and accordingly, the activated conference link circuit is restored to normal upon the recognition of an on-hook signal from that trunk when the main party disconnects.

In accordance with one feature of our invention, a switching array is provided which is selectively controllable so as to connect a plurality of lines to a directional conference link thereby enabling a selected one of the lines to direct communication to all other lines while restricting the other lines to communication only with that one line.

In accordance with another feature of our invention, a directional conference switching network for interconnecting conference links and trunks is arranged for one hundred percent access so as to fully utilize all such conference links and all such trunks as required.

In accordance with another feature of our invention, upon the establishment of a directional conference connection, the line connected to the main terminal of the link is arranged so as to control the off-normal condition of the conference link.

In accordance with another feature of our invention, upon the establishment of a conference connection among a number of subscribers, additional calling or called lines may automatically be added to the established conference by connection to subordinate terminals of the associated link.

In accordance with another feature of the invention, an attendant position is provided with equipment which enables the attendant to remain as a principal party to the conference connection.

In accordance with another feature of the invention, an attendant position is provided with equipment which enables the attendant to release from an established conference connection and subsequently rejoin the conference connection as a principal party.

In accordance with another feature of the invention, an attendant position is provided with equipment which enables the attendant to visually ascertain the lines associated with a conference connection and their respective roles as dominant or subordinate parties to the conference.

In accordance with another feature of the invention, each conference link circuit is arranged with equipment which provides sidetone for the attendant's receiver, and which equipment also serves the dual purpose of conveying audio signals from the attendant's transmitter to the dominant station and from the dominant station to the attendant's receiver.

Figure 18:
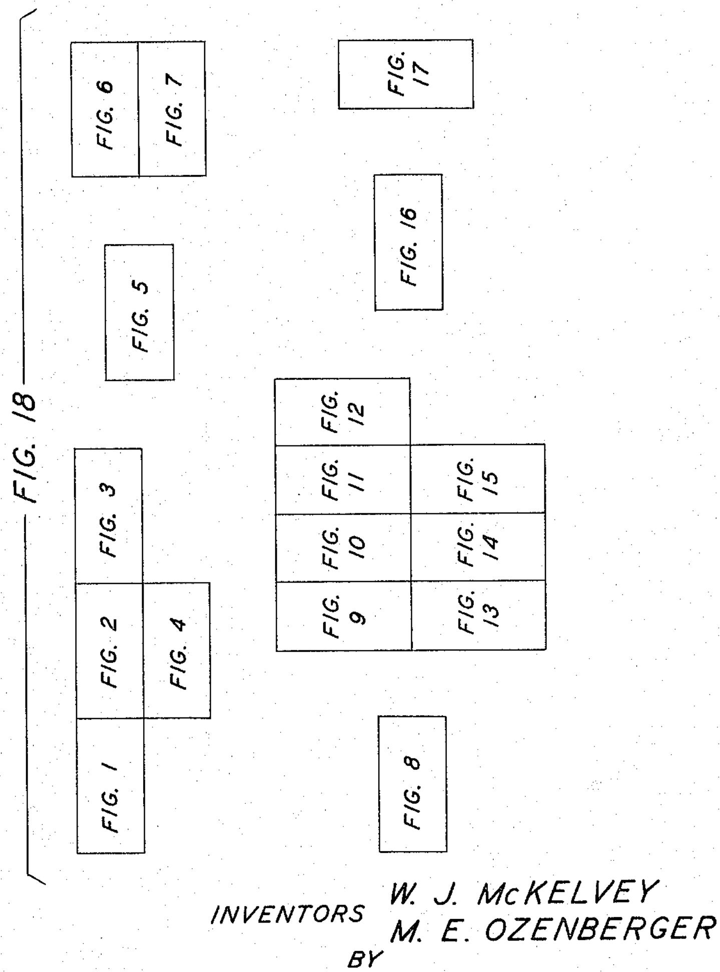

The foregoing objects and features of the invention, as well as others, will be more apparent from a consideration of the subsequent description and the drawing, in which:

FIGS. 1, 2, 3, and 4 comprise a block diagram showing the interrelation of the components of the exemplary embodiment;

FIGS. 5 through 17 show in greater detail the interrelation of the components of the exemplary embodiment; and FIG. 18 depicts the position in which the various figs. should be placed.

It will be noted that FIGS. 5 through 17 employ a type of notation referred to as "detached-contact" in which an "X," shown intersecting a conductor, represents a normally open contact of a relay and a bar, shown intersecting a conductor at right angles, represents a normally closed contact of a relay; "normally" referring to the unoperated condition of a relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, vol. 74, pages 505–513.

In order to facilitate an understanding of the invention, the description of the operation of the exemplary embodiment has been subdivided into a general descriptive portion designated 1.00 and a detailed descriptive portion designated 2.00. Section 1.00 and its subsections describe the invention in general terms with respect to FIGS. 1–4. Section 2.00 and its subsections describe the invention in detail with respect to FIGS. 5–17.

*1.00 general description*

The equipment of the present invention may be advantageously associated with a telephone switching system. One such system is disclosed in Patent No. 2,585,904, dated February 19, 1952, issued to A. J. Busch. It is to be understood, however, that the present invention is not limited to use with a system of this type, but may be utilized with other types of systems.

Referring now to FIGS. 1 through 4, the invention cited herein is embodied in common control crossbar switching equipment automatically responsive to signals from an operator position. It is particularly concerned with apparatus in trunk circuits 6 through N, FIG. 4, directional conference links 1 through N, FIG. 1, crossbar switch field 17, FIG. 2, controller 16, and attendant position circuit 15, FIG. 3. The remaining units, namely stations S18 through SN, FIG. 4, and the associated Busch switching system including trunks 32 through 41, trunk link frame 31, line link frame 30, marker and other common control circuits 42, originating register 43, and incoming register 44 are neither described nor shown in detail except where necessary for a more complete understanding of the invention. However, the Busch patent may be consulted where a complete understanding of the construction and operation of these units is desired.

In the illustrative embodiment, stations S18 through SN are shown as being connected by lines L18 through LN, respectively, to line link frame 30, and trunks 32 through 41 are shown as being terminated on trunk link frame 31 in the Busch switching system. As disclosed fully in the Busch patent, lines terminated on line link frames and trunks terminated on trunk link frames may be interconnected by crossbar linkage under control of common control circuits, such as marker 42. In the instant disclosure trunks 32 through 41 may advantageously be arranged as two-way trunk circuits which are well known in the art, and in the instant embodiment may comprise, as a circuit unit, the combination of an incoming and an outgoing trunk, described separately in the Busch disclosure.

Trunks 32 through 41 are shown as being connected to trunk circuits 6 through N, respectively; each of which is, in turn, shown terminated on a corresponding one of verticals 20–29, respectively, of crossbar switch field 17. Conference link circuits 1 through N, FIG. 1, are terminated on the horizontals of crossbar switch field 17, FIG. 2, which is controlled by attendant position circuit 15, FIG. 3, via controller circuit 16.

An inspection of crossbar switch field 17 will reveal that each conference link is associated with two horizontal levels, the backward horizontal (lower level) of which is multiplied in conventional fashion across all switch verticals. However, eacsh conference link forward horizontal (upper level) is arranged such that the crosspoint at each vertical is independently cabled to the associated conference link. It is apparent, therefore, that by the closure of appropriate crosspoints in the well-known fashion, trunk circuits 6 through N have access collectively, via their respective verticals, to the backward horizontal multiple of each conference link and also have independent access to each conference link via the forward horizontal nonmultiple connection. As will be described in detail hereinafter, a station connected through to a conference link via a backward horizontal is enabled to engage in simultaneous two-way communication with all stations which are connected through to the associated forward horizontal, while such stations connected to the forward horizontal are incapable of communication with each other.

*1.01 originating request for directional conference feature*

For purposes of illustration we shall assume that station S18 desires to utilize the directional conference feature as the dominant station in a conference which includes stations S19, S20, and S21 as subordinate stations. As will be more apparent hereinafter, the number of parties to the conference are not limited to four, but may comprise any desired number of stations.

When station S18 desires service, an originating register, such as originating register 43, is attached to the line, and dial tone is returned, as set forth in the Busch patent. We shall assume that the calling party has been instructed to dial a code such as 457 to obtain use of this feature. Accordingly, upon receipt of this code, marker 42 is called in, and a connection is established between line L18 and, for example, trunk 33 as described in the Busch patent for an originating call.

Figure 3:
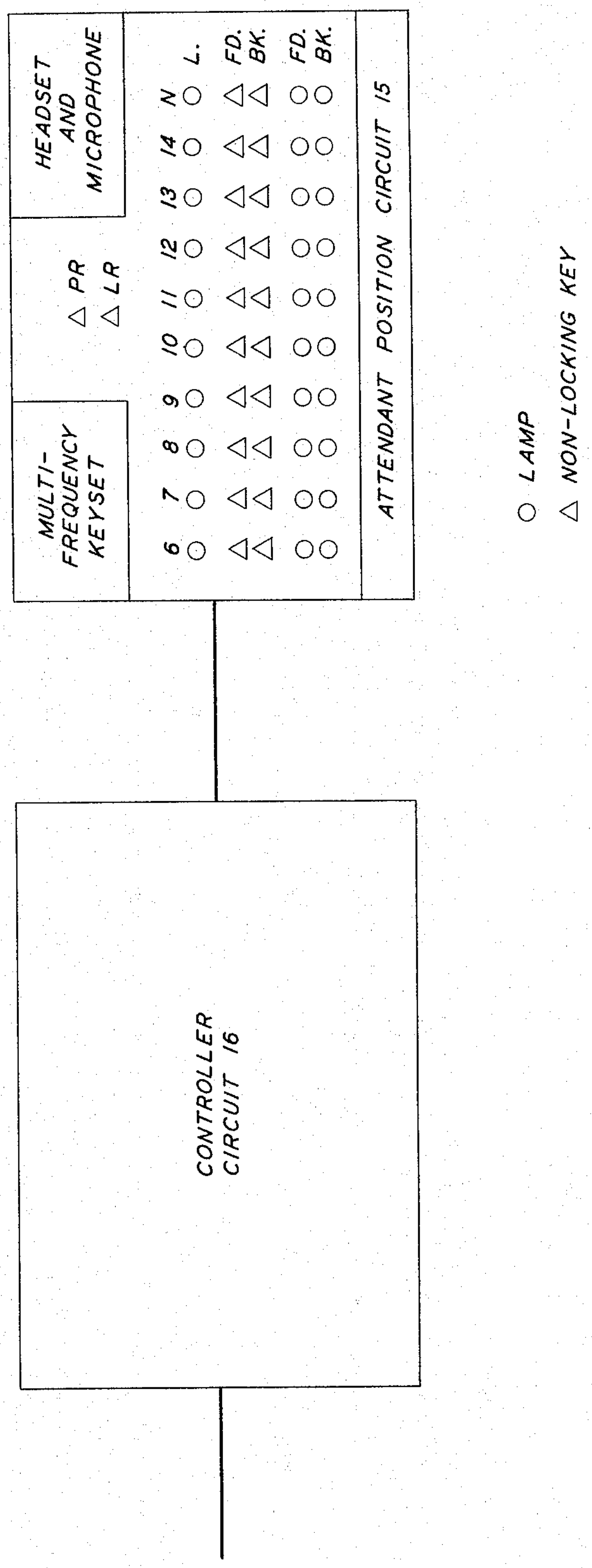
Figure 4:
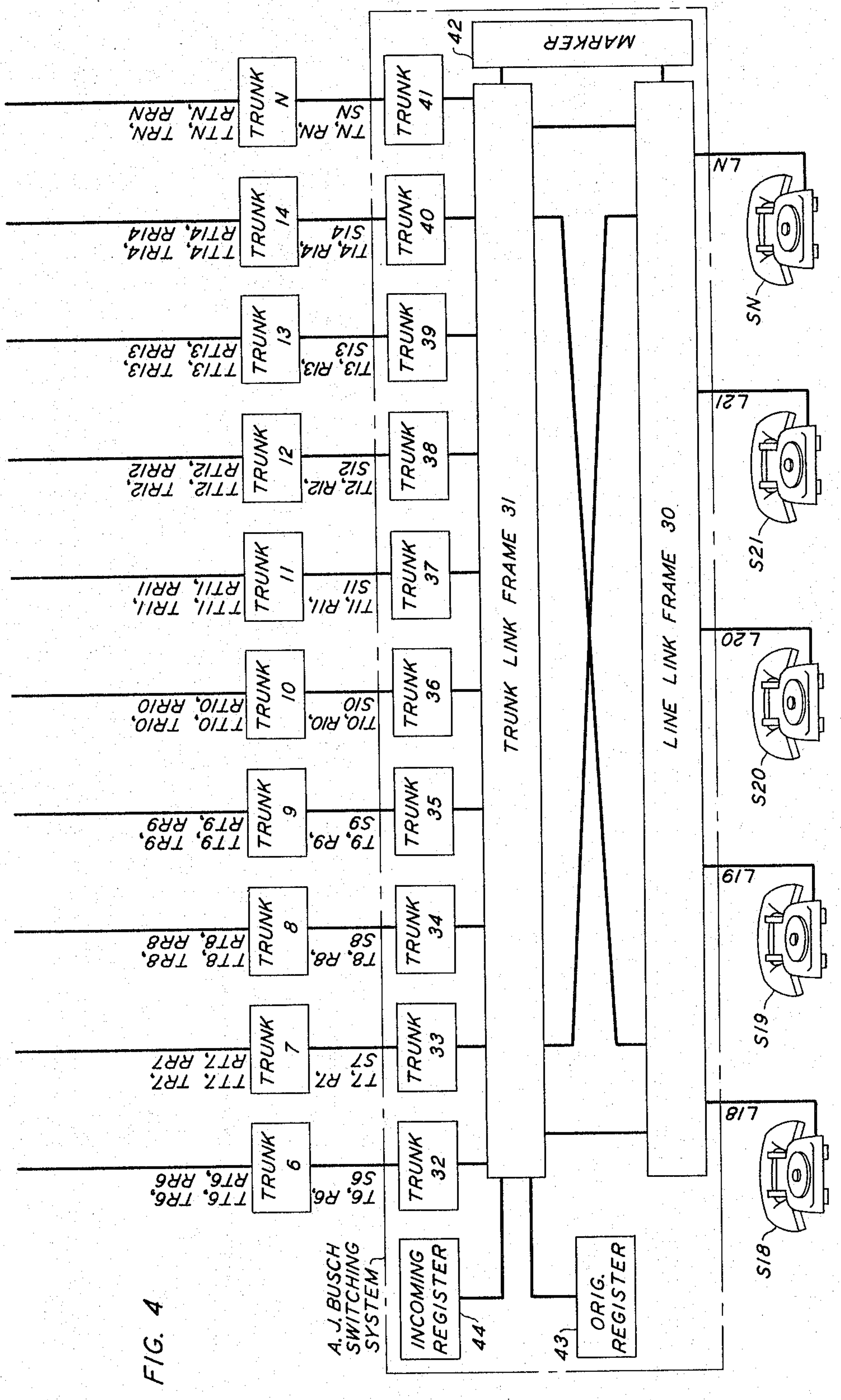

The sleeve lead, such as S7, FIG. 4, which is grounded upon selection of trunk 33 as set forth in Busch, may advantageously be extended to activate two-way trunk 7 so as to alert the operator via a lighted lamp L7 at attendant position 15, FIG. 3, that a party desires service. Accordingly, in the well-known manner, lamp L7 lights at attendant position 15. It should be noted at this point, that while only one attendant position is shown, in practice many more conference links and many more trunks would be provided and their control distributed over several attendant positions, each of which may also be arranged for other conventional operator functions.

Upon recognizing a request for service, the attendant momentarily depresses the associated BK key, namely key BK7. As will be described in detail hereinafter, controller circuit 16 is thereupon activated to close crosspoints associated with an idle conference link which, for instance, may be the crosspoints designated 14–21 in crossbar switch field 17, FIG. 2. Station S18 is thus connected through the aforementioned trunk circuits to the backward horizontal of conference link 3 and, as will be more apparent hereinafter, is thereby in telephonic communication with the attendant at attendant position 15.

*1.02 adding subordinate stations to conference link*

Figure 2:
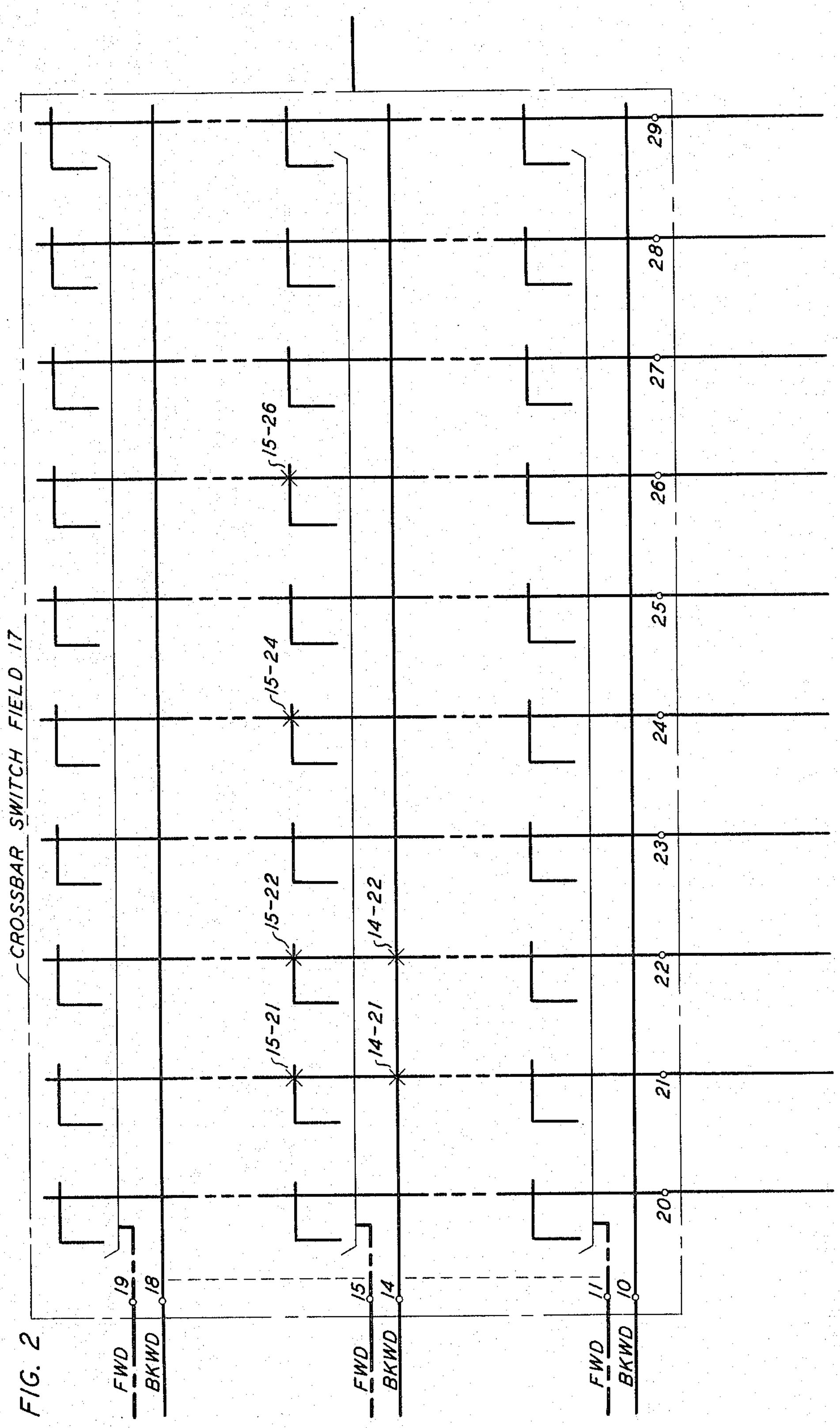

Upon ascertaining from station S18 that stations S19, S20, and S21 are to be the subordinate parties to the conference, the attendant proceeds to add these parties to conference link 3 via the forward horizontal. For example, to add station S19, any idle trunk, such as trunk 8, may be selected by the attendant momentarily depressing nonlocking key FD8. Crosspoint 15–22, FIG. 2, is thereby closed to interconnect conference link 3 and trunk 8 via forward horizontal 15.

The activation of trunk 8 enables trunk 34 which is the counterpart of trunk 8 in the Busch system. As described in detail for a terminating call in the Busch disclosure, suitable incoming register equipment, such as incoming register 44, is attached to trunk 34. As will be described more fully hereinafter, a momentary spurt of tone informs the attendant that the called directory number of station S19 may now be transmitted. A multifrequency key set is provided at attendant position circuit 15 for this purpose. As set forth in Busch, upon receipt of the called line directory number as manifested by the multifrequency pulses transmitted by attendant station 15, a connection is established between trunk 34 and station S19. It is, of course, obvious that the called station is not restricted to being one directly served by the Busch system, but in practice could be any station in the telephone network accessible via the Busch system.

Summarizing at this point, station S18 is connected via trunk 33, trunk 7 and crosspoint 14–21 to the backward or dominant terminal of conference link 3. Upon the called party answering at station S19, that station is connected via trunk 34, trunk 8, and crosspoint 15–22 via the forward horizontal to a subordinate terminal of conference link 3.

Stations S20 and S21 may also be added via forward horizontal 15 to conference link 3 in the same manner as set forth for station S19. For purposes of explanation, we may assume that station S20 is connected to forward horizontal 15 of conference link 3 via trunk 36, trunk 10, and crosspoint 15–24 and that station S21 is connected to forward horizontal 15 of conference link 3 via trunk 38, trunk 12 and crosspoint 15–26. The particular crosspoints closed in FIG. 2 have been selected merely for purposes of illustration; it will be apparent from a reading of the detailed description that the conference may be established utilizing any conference link terminated on the horizontals of the crossbar switch field and any or all trunks terminated on the verticals.

If, for example, the purpose of the conference is to elicit bids on a contract, the party at station S18 may now simultaneously provide all pertinent information to parties at stations S19, S20 and S21, and also answer all relevant inquiries by each called party. Further, if offers on such contract are made by the parties at stations S19, S20, and S21 at this time, such offers are audible only to station S18 since communication between subordinate stations in the conference is inhibited and, in fact, event their respective identities are known only at station S18.

*1.03 release of conference connection*

Electrical control of the conference is also provided to the dominant station. Therefore, upon abandonment of the call by station S18, conference link 3 and all associated trunks are released.

*1.04 originating station as subordinate station*

While the above part of the general description pertains to a conference call wherein station S18 is the dominant party, it is equally possible for S18 to initiate the conference connection and yet be a subordinate party to the subsequently established conference. In this case the call proceeds as described to the point where the party at station S18 and the attendant are in telephonic communcation. The attendant, upon ascertaining the role that station S18 is to play in the conference, merely depresses the position release PR key and depresses the FD7 key. Station S18 is thereby closed through to conference link 3 via crosspoints 15–21 on forward horizontal 15 and crosspoints 14–21 are restored to normal. Assuming that station S19 is to be the dominant party to the conference, the attendant then momentarily depresses nonlocking key BK8 and a connection may thereby be established to station S19 exactly as described earlier, except that station S19 is connected through to conference link 3 via crosspoints 14–22 of backward horizontal 14. Stations S20 and S21 may then be added to the forward horizontal exactly as described above.

*1.05 position release*

As will be more apparent from a reading of the detailed description, if desired, the attendant may remain in a supervisory capacity as a party to the conference. In this capacity the attendant may release individual lines on the forward horizontal by depressing the associated FD key followed by the LR key. The attendant may also add additional lines to the forward horizontal during the course of the conference, as required, by proceeding as described in paragraph 1.02 for stations S19, S20, and S21.

If supervision of the conference is not required, then upon completing the connection to station S21, the attendant momentarily operates nonlocking key PR to release the attendant position from the conference connection. The attendant is thus free to establish other conference connections or to perform other attendant functions. In the meantime, the conference may proceed between station S18 and stations S19, S20 and S21.

*2.00 detailed description*

FIGS. 5 through 17 should be arranged as shown in FIG. 18 to facilitate a reading of the detailed description as contained hereinafter. It will be noted that the relays shown on these figures retain their functional designation, for example, "HM20" is the functional designation of hold magnet 20. To facilitate an understanding of the detailed description, each functional designation is preceded by a numerical designation which indicates the figure on which the operate path for that particular relay is shown. Thus, hold magnet 20 is designated 7HM20 and, accordingly, the operate path for this device is shown on FIG. 7. Also, the contacts associated with each relay have been assigned a number, and this number is preceded by the relay designation. For example, contact "1" of hold magnet 21 is designated 7HM21–1.

Figure 12:
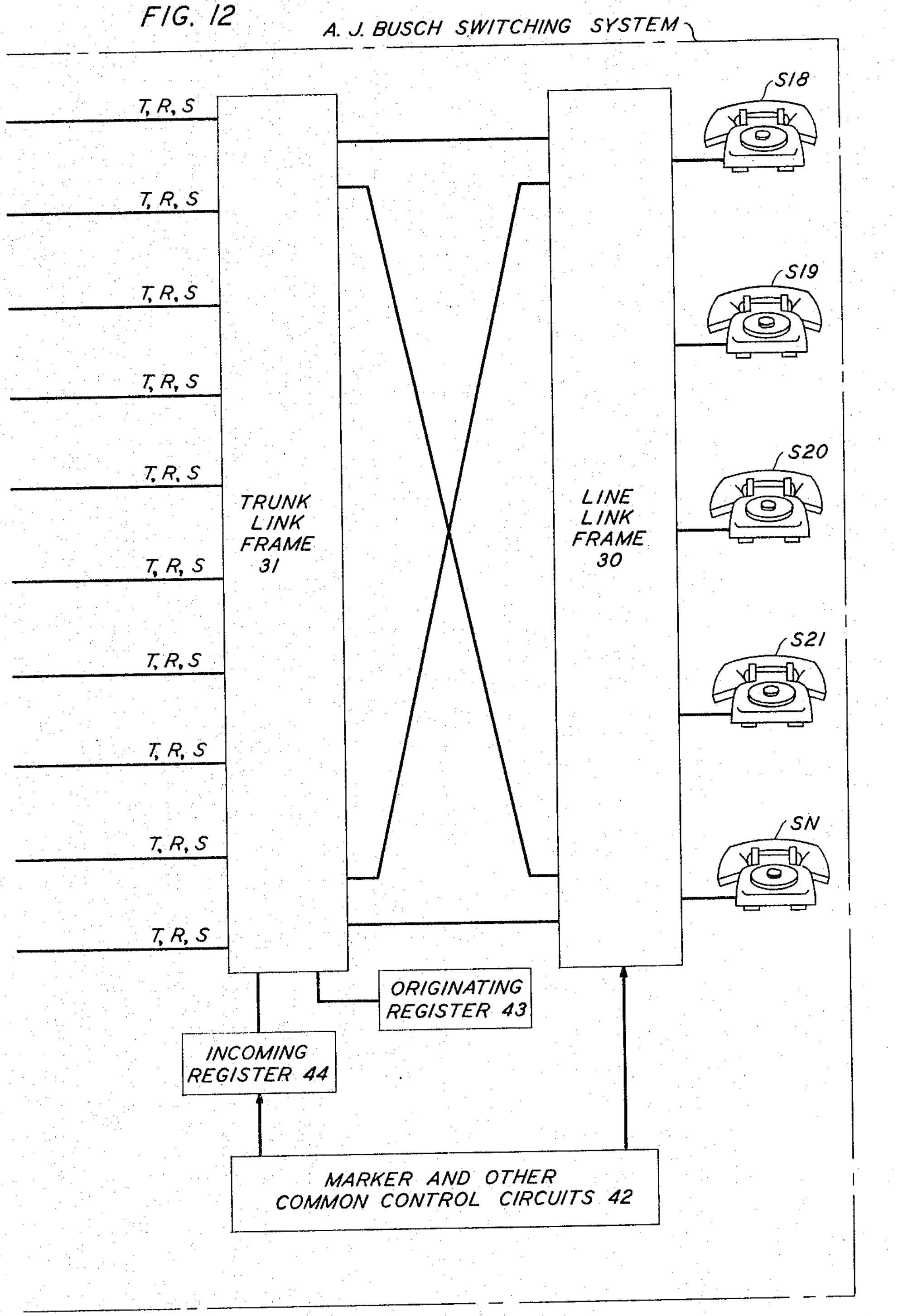
Figure 13:
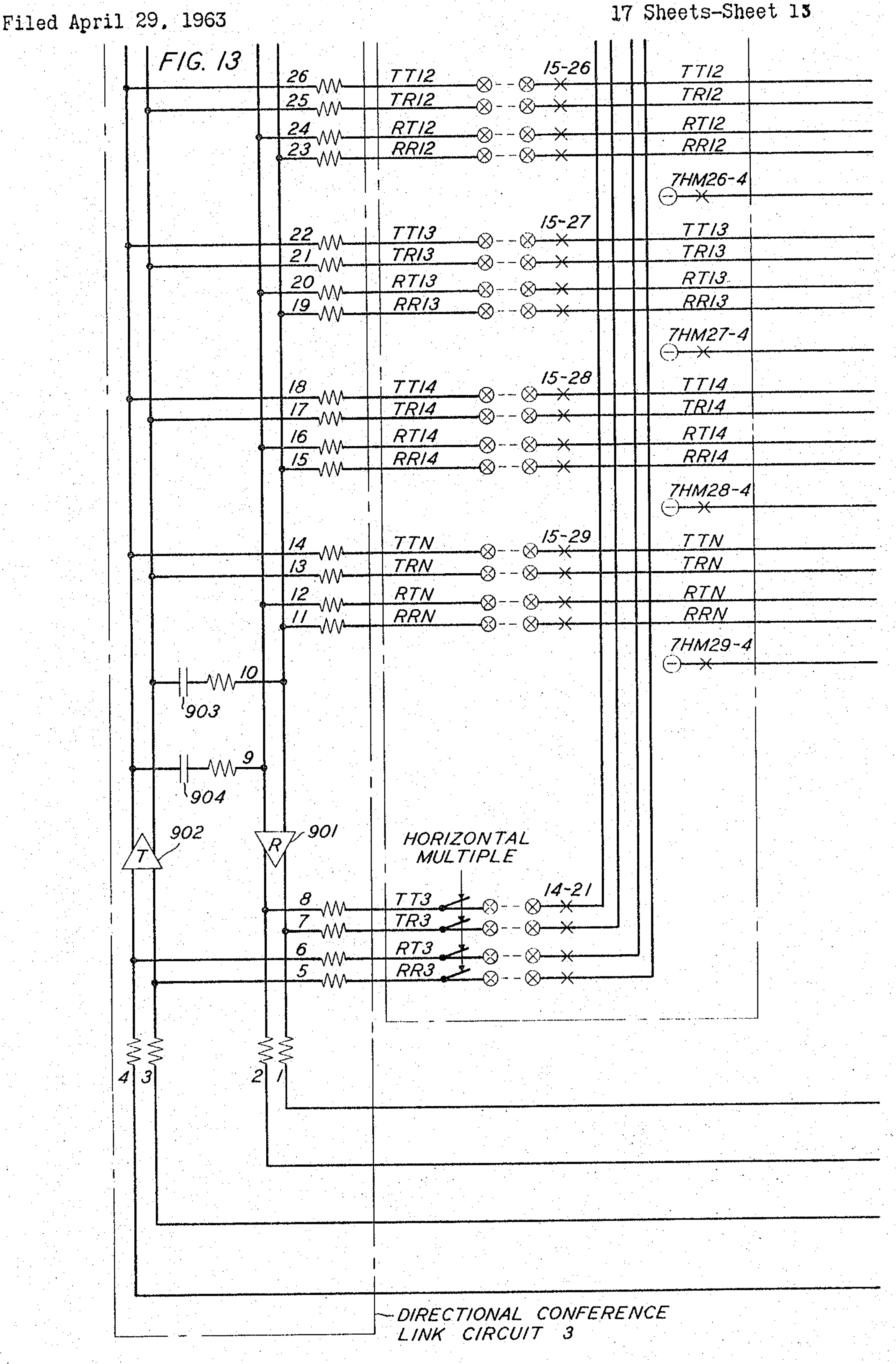
Figure 14:
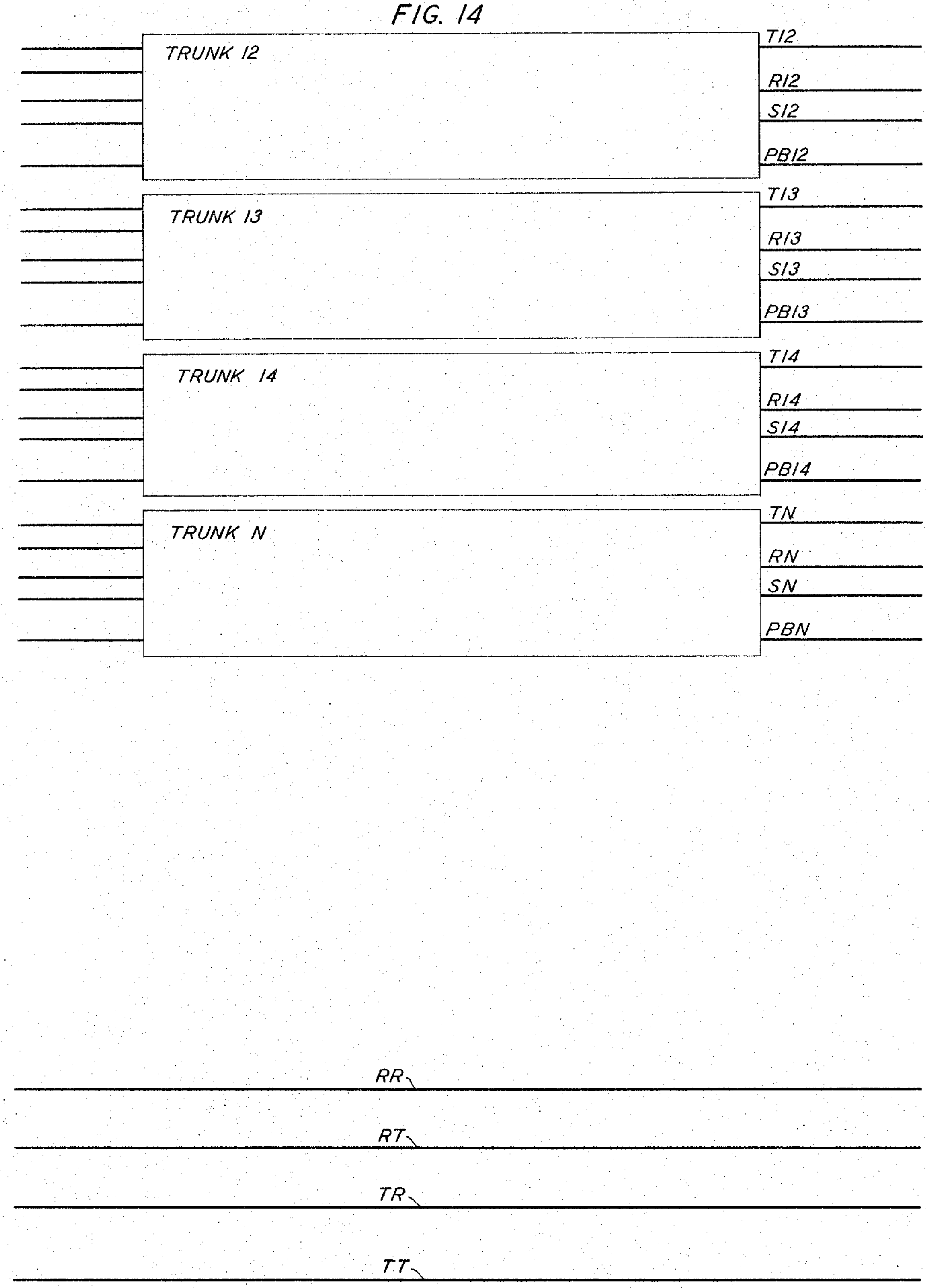
Figure 15:
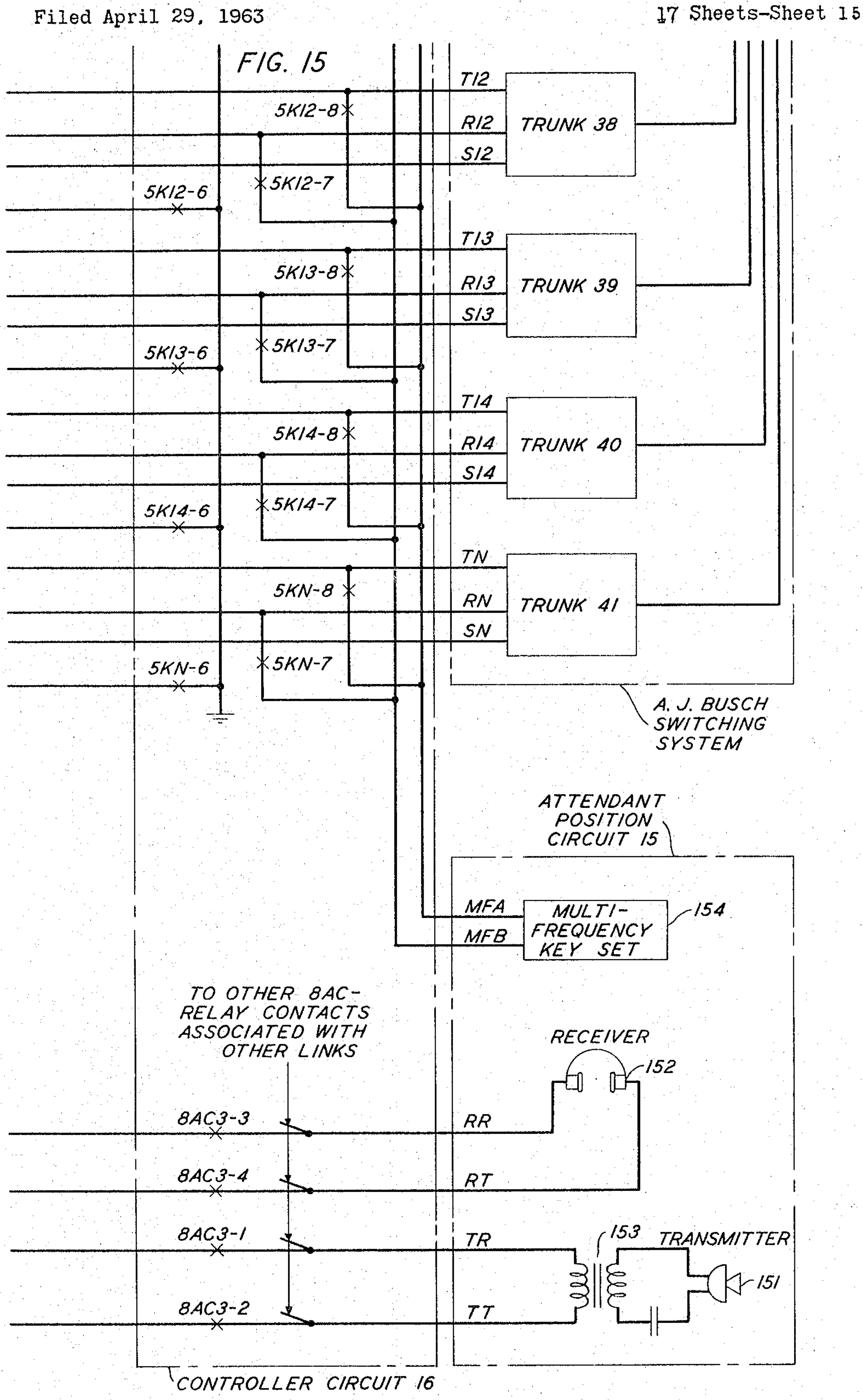

For purposes of explanation, we shall assume that a station S18, shown on FIG. 12, desires to utilize the directional conference feature with respect to stations S19, S20, and S21, wherein station S18 is to assume the dominant or controlling role in the conference and the other three stations are to be subordinate parties to the conference.

*2.01 originating connection from station S18 to attendant position 15*

We shall assume that station S18 has been instructed to dial a particular code, such as 457, when that party desires to place a directional conference call. Accordingly, as set forth in detail in the A. J. Buch patent, in response to an off-hook condition at station S18, an originating register, such as originating register 43, is connected via crossbar linkage to station S18, and dial tone is returned. When the party has completed dialing and the information is transferred to marker 42, that circuit will recognize, as set forth by Busch, that this call is to be completed to a trunk which terminates before attendant position 15, FIG. 17, and which does not require a sender (not shown). A connection is thereupon established between station S18 and a trunk, such as trunk 33, FIG. 11. As further set forth in detail in the Busch patent, upon the establishment of a connection between a station and an outgoing trunk, ground is present on the S lead which is the control lead of the channel linkage interconnecting the trunk and the station. This ground may advantageously be extended from trunk 33 via lead S7 so as to operate relay 10S7 in trunk 7, FIG. 10.

Figure 5:
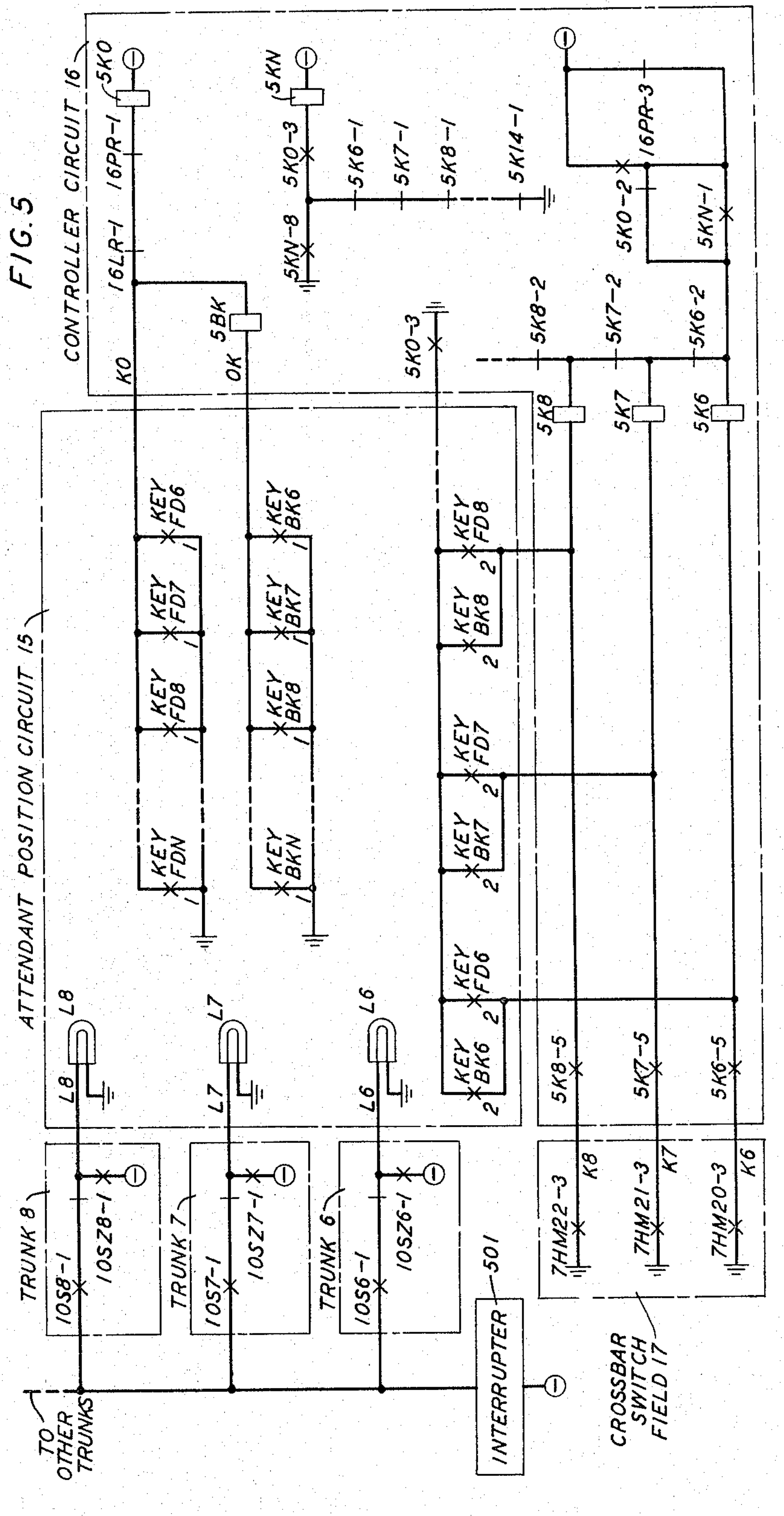

Referring now to FIG. 5, the operation of relay 10S7 closes its make contacts 1 so as to provide negative battery which extends through interrupter 501, through released break contacts 10SZ7–1, over the L7 lead to energize lamp L7 in a flashing manner at attendant position 15.

The enabling of lamp L7 in this manner alerts the attendant at position 15 to recognize that a party desires to utilize the directional conference feature. Accordingly, the attendant operates nonlocking key BK7 at the position. The operation of key BK7 extends ground through its make contacts 1 over the OK lead to controller circuit 16, through the winding of relay 5BK, released break contacts 16LR–1, released break contacts 16PR–1 to battery through the windings of relay 5KO. Thus, relay 5BK and 5KO are operated at this time. The resultant closure of make contacts 5KO–2 prepares the operate path for relay 5K7. The closure of make contacts 5KO–3 operates relay 5KN by extending its operate path through a chain of break contacts on relays 5K6, 5K7, and through 5K14 to ground. The operation of relay 5KN completes the operate path of relay 5K7, which extends from negative battery, operated make contacts 5KO–2, 5KN–1, released break contacts 5K6–2, through the winding of relay 5K7, operated make contacts 2 on key BK7 to ground which is present on 5KO–3.

Summarzing at this point, the attendant, upon recognizing that a particular party desires to utilize the conference feature, depresses the BK key associated with the flashing lamp. The operation of this key, after a check of the released condition of all other keys, has caused the operation of relay 5K7 which is associated with this particular key and lamp.

*2.02 selection and seizure of an available conference link circuit*

Figure 6:
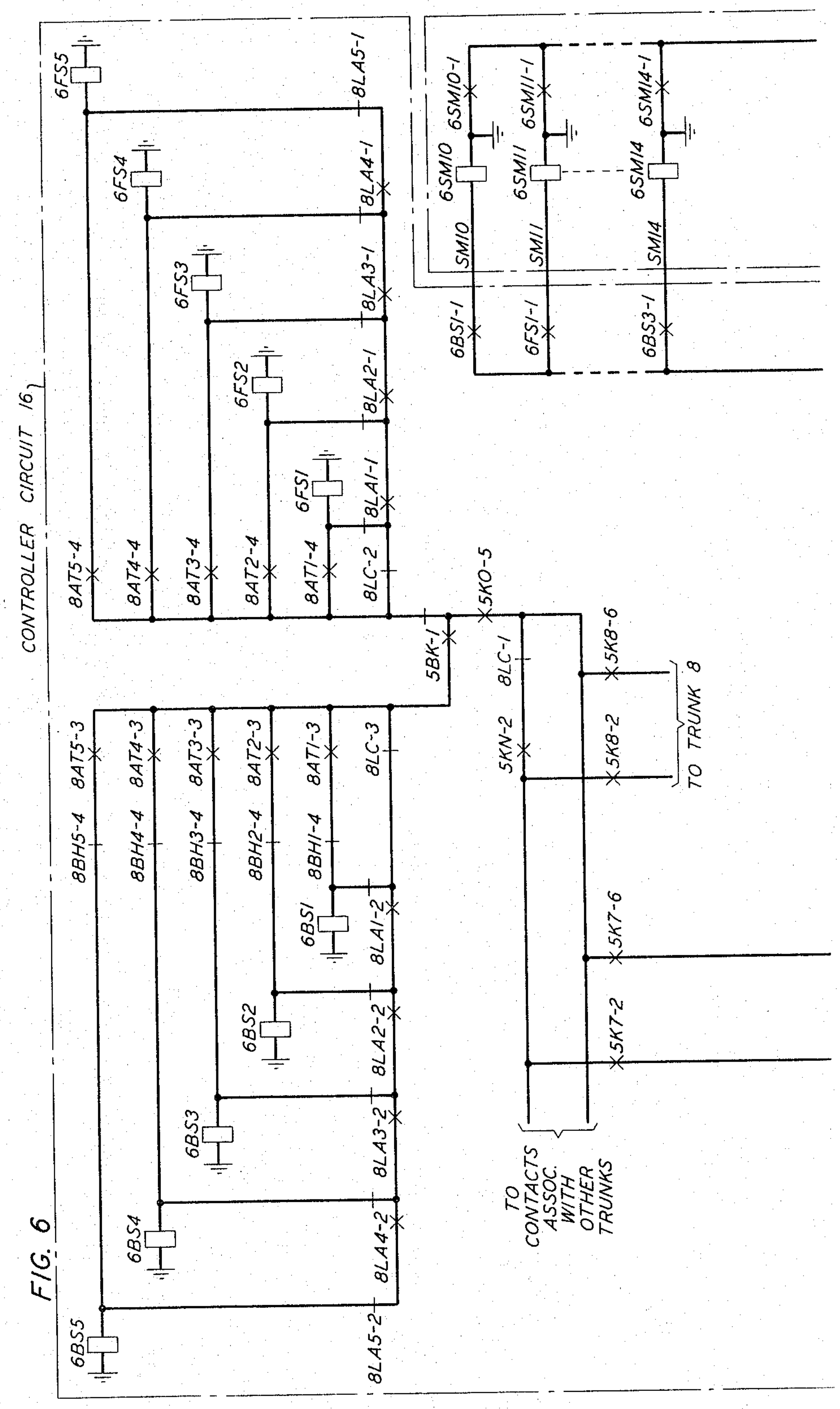
Figure 7:
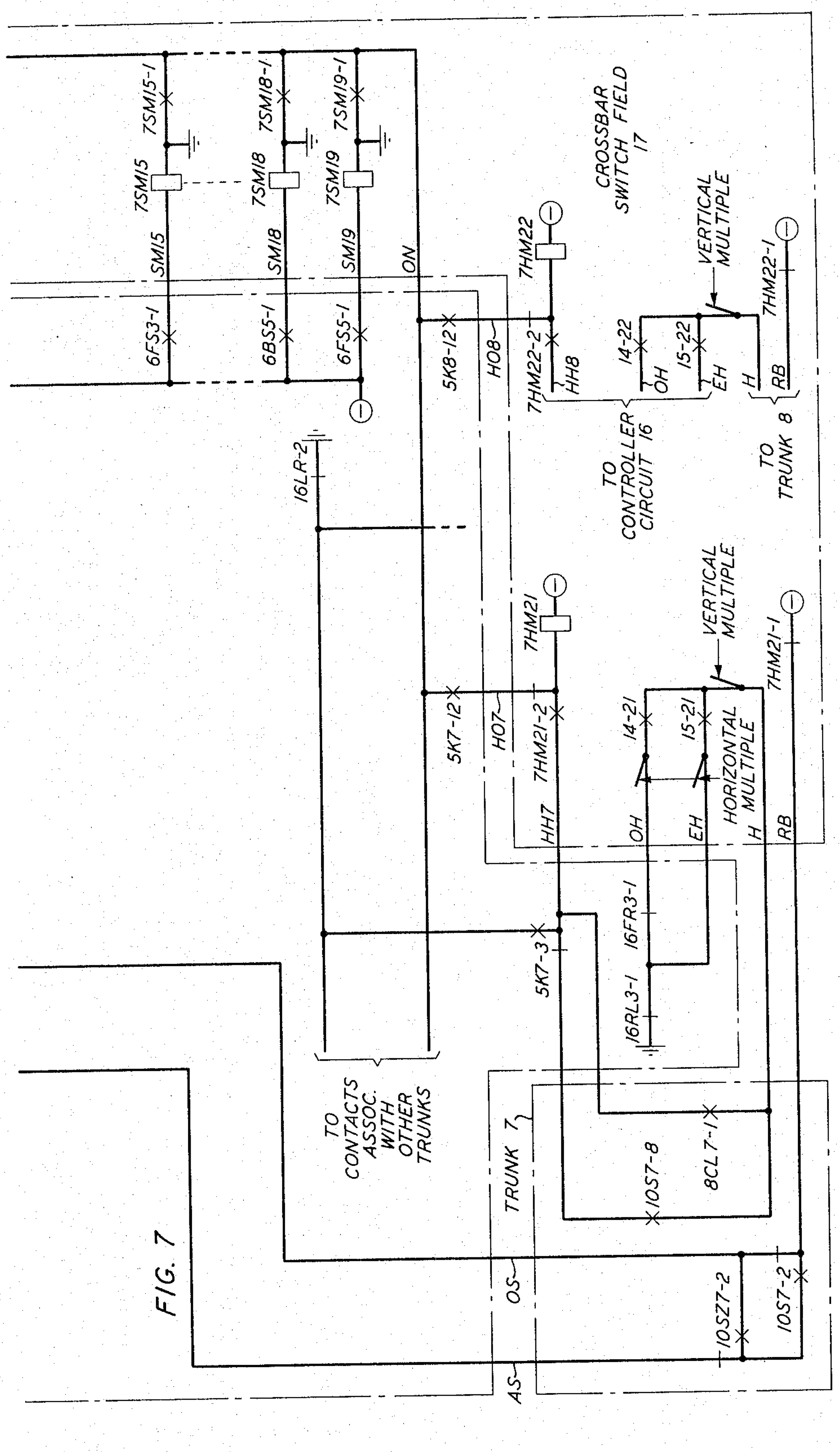

Referring now particularly to FIGS. 6 and 7, we shall assume for purposes of explanation that directional conference link circuits 1 and 2 are currently involved serving other stations. Accordingly, as will be more apparent hereinafter, relays 8LA1, and 8LA2, FIG. 8, will be operated at this time. Proceeding now with the description; negative battery is extended over released break contacts 7HM21–1 from crossbar switch field 17, via the RB lead to trunk 7, through operated make contacts 10S7–2, released break contacts 10SZ7–2, via the AS lead to controller circuit 16, through operated make contacts 5K7–2, 5KN–2, released break contacts 8LC–1, operated make contacts 5KO–5, make contacts 5BK–1, released break contacts 8LC–3, through operated make contacts 2 of relays 8LA1 and 8LA2, released break contacts 8LA3–2, and through the winding of relay 6BS3 to ground. Relay 6BS3, accordingly operates and closes its make contact 1, which extends negative battery via the SM14 lead to crossbar switch field 17, through the winding of select magnet 6SM14 to ground to thereby operate the select magnet.

Referring momentarily to FIG. 2, it is to be noted that select magnet 6SM14 is associated with horizontal 14 which is the backward horizontal of directional conference link circuit 3. It, therefore, remains but to operate the hold magnet associated with vertical 21 in this figure in order to enable crosspoints 14–21.

Returning now to FIG. 6, the operation of 6SM14 extends ground through 6SM14–1, over the ON lead to controller circuit 16, through 5K7–12 operated, via lead HO7 to crossbar switch field 17, through released break contacts 7HM21–2, through the winding of hold magnet 7HM21 to battery. Hold magnet 7HM21 thereupon locks operated to ground via operated make contacts 7HM21–2, via lead HH7 to controller circuit 16, operated make contact 5K7–3 to ground on 16LR–2. At this point select magnet 14, which is associated with the backward horizontal of conference link 3, has been enabled followed by the operation of hold magnet 7HM21, thereby closing crosspoints 14–21 of FIG. 2.

Break contacts 1 of 7HM21, in operating, removes negative battery from the RB lead, thereby causing the release of relay 6BS3 which, in turn, restores contacts 6BS3–1 and thereby opens the operate path of select magnet 6SM14, releasing it.

*2.03 completion of the transmission path between station S18 and attendant position 15*

Figure 8:
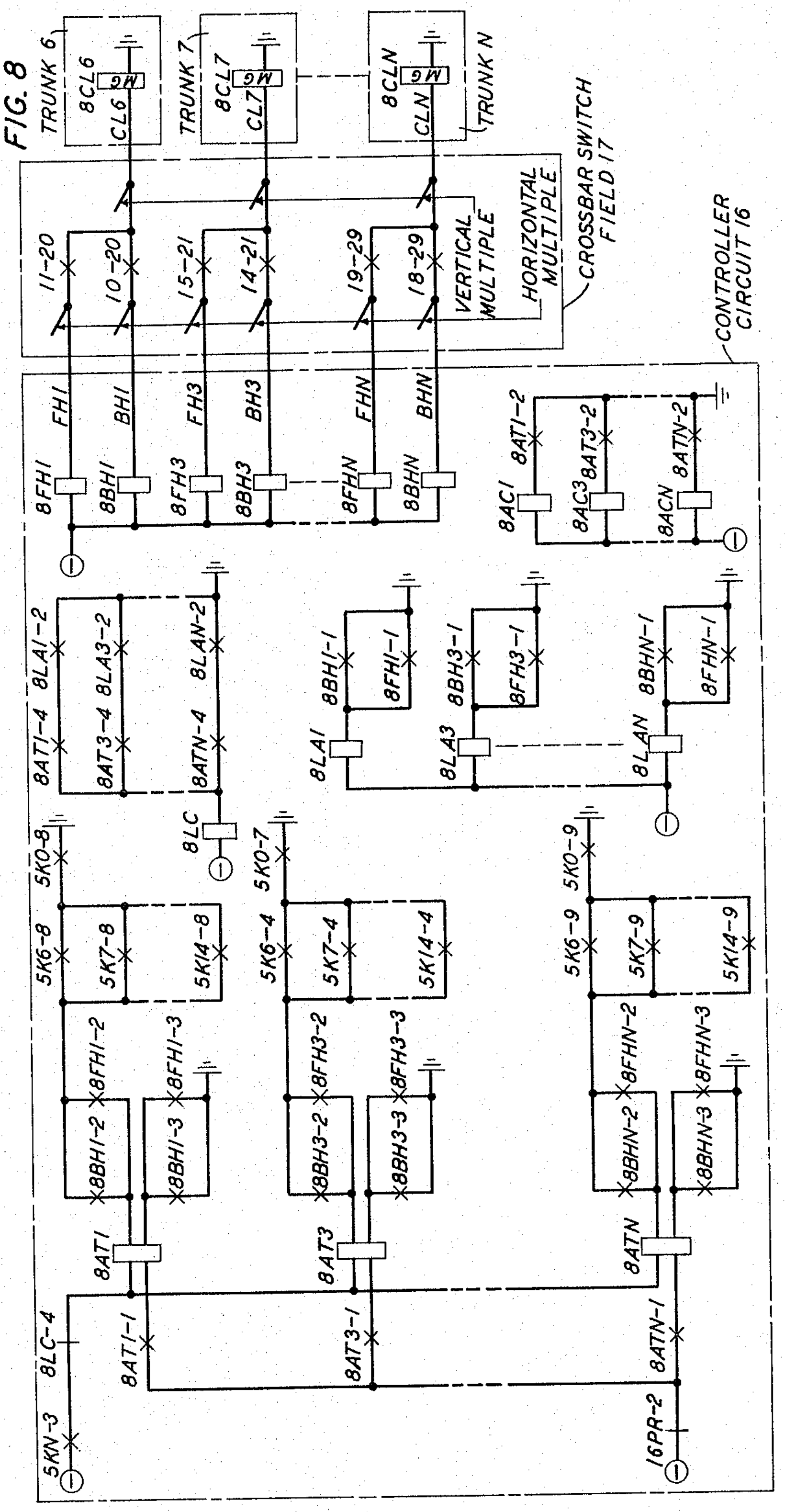
Figure 9:
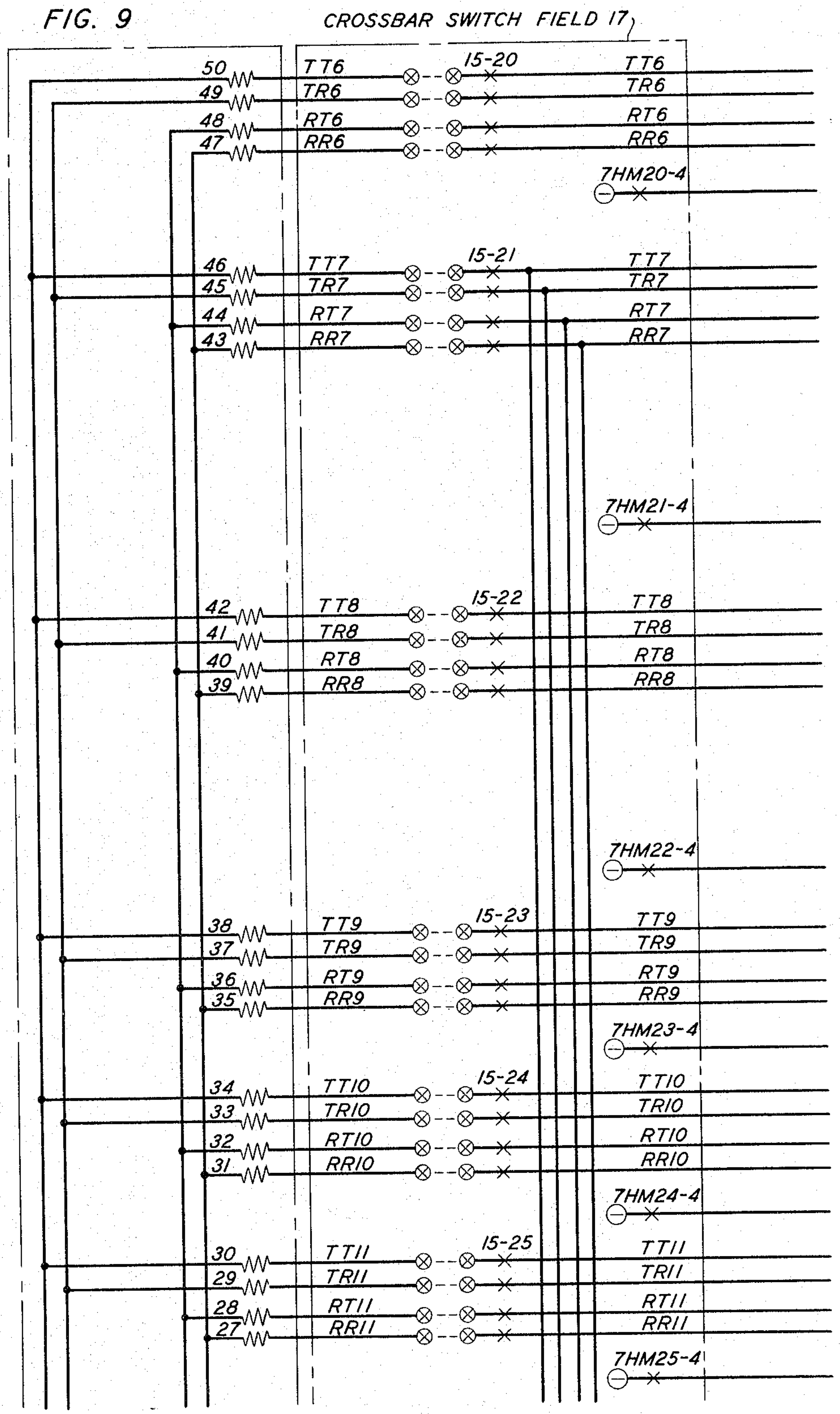
Figure 10:
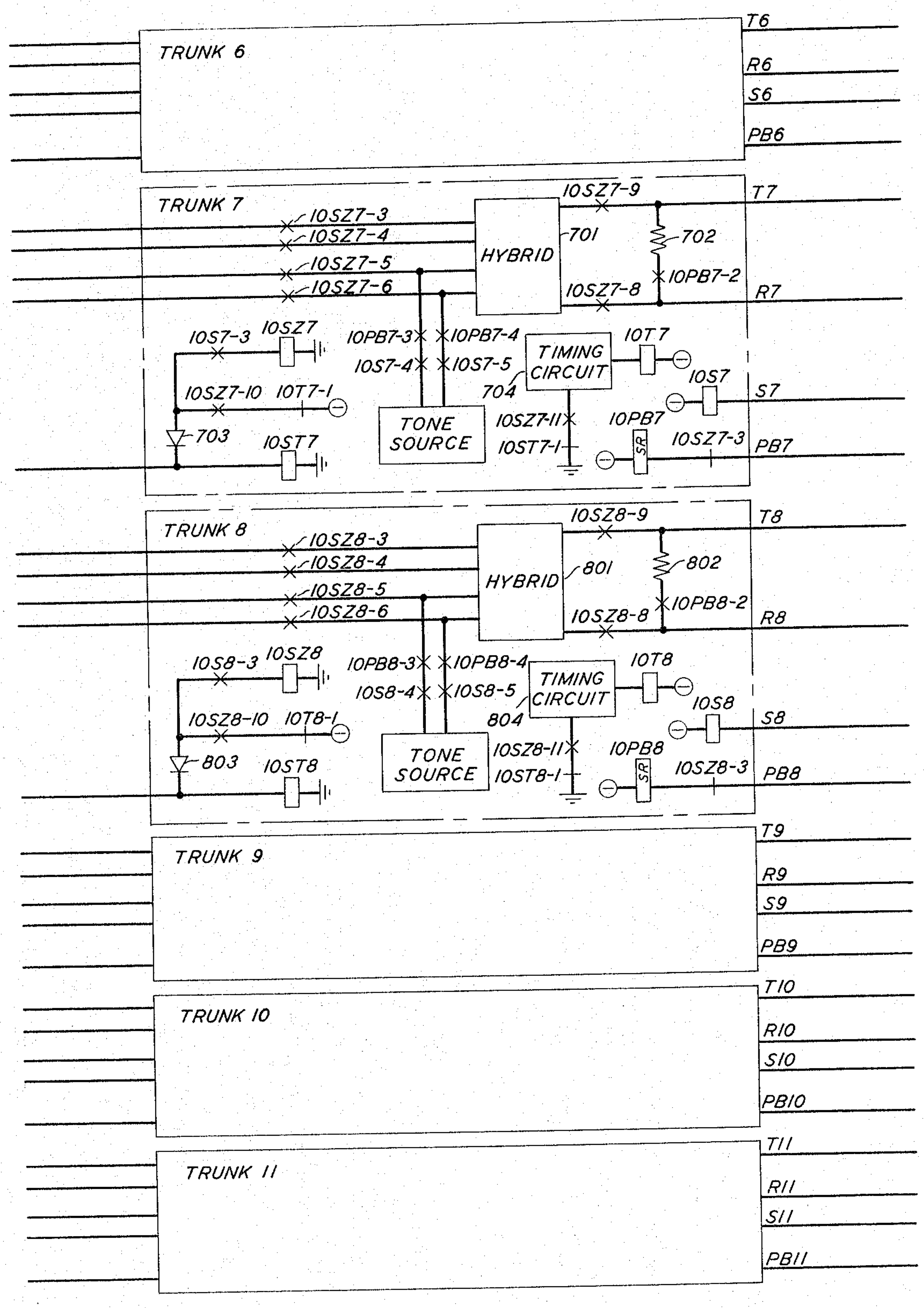
Figure 11:
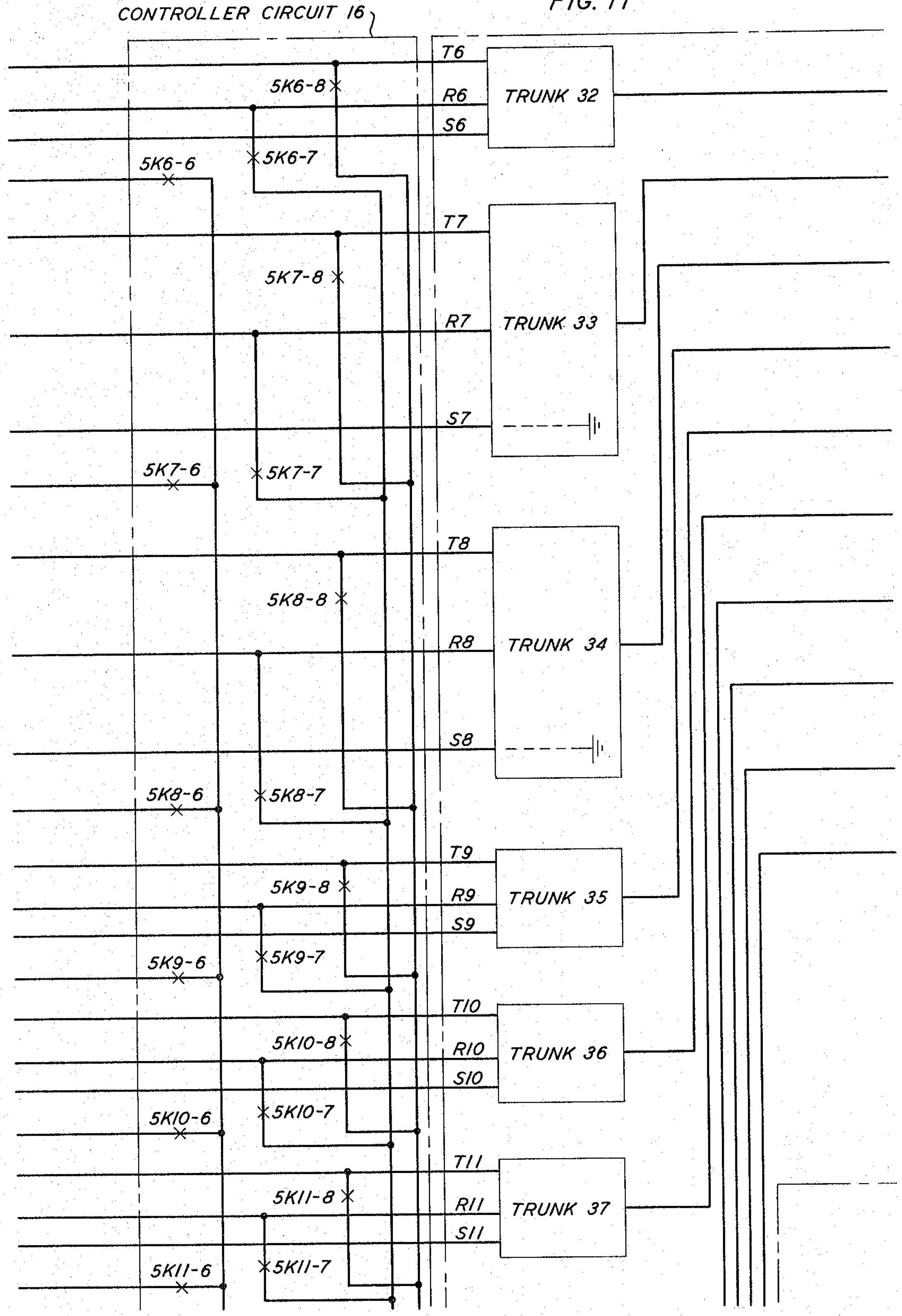

Referring now to FIG. 8, it is to be noted that each of trunks 6 through N are provided with an 8CL– relay which is selected to be marginal, and is arranged such that it will operate when connected in series with an 8BH– relay only and not when connected in series with an 8FH– relay which is of a higher electrical resistance. Thus, relays 8CL– operate only when the associated trunk is connected to a conference link via the backward horizontal. Accordingly, since at this time, trunk 7 has been extended via crosspoints 14–21 to the backward horizontal of conference link circuit 3, relay 8CL7 operates by ground which is extended through its operate winding over the CL7 lead to crossbar switch field 17, where it is extended through crosspoints 14–21 over the BH3 lead through the winding of relay 8BH3 to negative battery. Therefore, relays 8BH3 and 8CL7 are operated at this time. Relay 8LA3 then operates by negative battery which extends through the winding of 8LA3, through operated make contacts 8BH3–1 to ground. Positive ground is thereupon extended to relay 8AT3 through 5KO–7 operated, 5K7–4 operated, 8BH3–2 operated through the upper winding of relay 8AT3, released break contacts 8LC–4 to negative battery which is present through operated make contacts 5KN–3. Accordingly, relay 8AT3 operates at this time and locks operated by positive ground which is extended through 8BH3–3, the lower winding of 8AT3, operated make contacts 8AT3–1 to negative battery via 16PR–2 released. Relay 8AC3 also operates at this time by an obvious circuit which extends through 8AT3–2 to ground.

Referring now to FIG. 6, as stated earlier, it was assumed that conference link circuits 1 and 2 are occupied on previously established conferences and that, accordingly, relays 8LA1 and 8LA2 are operated at this time. Therefore, the operation of relay 8LA3 enables transfer contacts 8LA3–1 and 8LA3–2 so as to extend succeeding bids for a conference link to the next highest numbered conference link in the chain, namely, as manifested by released relays 8LA4 and 8LA5. The operation of relay 8AT3 completes an alternate operate path for operated relay 6FS3 which is provided for the addition of lines on the forward horizontal as will be more apparent from the description which is contained hereinafter. It is to be noted that operated make contacts 8AT3–3 also provide an alternate path for the operation of relay 6BS3. However, this alternate path is ineffective by virtue of enabled break contacts 8BH3–4. This is provided to prevent more than one station from being connected to the backward horizontal and, consequently, limits the number of parties in control of the conference to one station.

Referring now to FIG. 5, when the attendant at position 15 releases key BK7, he thereby opens the previously described operate path of relays 5KO and 5BK. The release of relay 5KO releases relay 5KN. Relay 5K7 remains operated at this time by negative battery which extends through 16PR–3 and 5KO–2 released, the winding of 5K7, through make contacts 5K7–5 operated, via the K7 lead to crossbar switch field 17, and thence to ground which is present on operated make contacts 7HM21–3.

Summarizing at this point, the control relays, such as 6BS3 and select magnet 6SM14 and the check relays 5KO, 5KN, are therefore released at this time. Relay 5K7 remains operated, in addition to relays 8BH3, 8LA3, 8AT3 and 8AC3.

Turning now to FIGS. 9 through 15, it will be observed that a transmission path extends from attendant position 15 via transmitter 151, transformer 153, the TR and TT leads, operated make contacts 8AC3–1 and 8AC3–2, resistances 3 and 4, through transmit amplifier 902, capacitors 903 and 904, resistances 9 and 10, receive amplifier 901, through resistances 7 and 8 to the TT3 and TR3 leads, to correspondingly designated punchings on crossbar switch field 17, where they are further extended through the operated crosspoints 14–21 to the TT7 and TR7 leads through operated make contacts 10SZ7–3 and 10SZ7–4 to hybrid 701 in trunk 7. Hybrid 701 may advantageously be arranged, as well known in the art, to provide a high return loss attenuation between the TT, TR leads transmit path and the RT, RR leads receive path of trunk 7. From hybrid 701 the transmit leads are extended as leads T7 and R7 to trunk 33 in the A. J. Busch switching system. From trunk 33 the T7 and R7 leads are extended by crossbar channel linkage to station S18 as disclosed in the Busch patent.

A corresponding transmission path exists from station S18 to attendant position 15 via the T7 and R7 leads from station S18 to trunk 33 as set forth in the Busch patent. From trunk 33 the T7 and R7 leads further extend to hybrid 701, from which they are extended as leads RT7 and RR7, through operated make contacts 10SZ7–5 and 10SZ7–6, through operated crosspoints 14–21 on crossbar switch field 17, to punchings RT3 and RR3, through transmit amplifier 902, capacitors 903 and 904, resistances 9 and 10, receive amplifier 901, resistances 1 and 2, and then via the RR and RT leads, through 8AC3–3 and 8AC3–4 in controller circuit 16 to receiver 152 at attendant position 15. At this point station S18 and the attendant at position 15 are in telephonic communication and the subscriber at station S18 may thereupon advise the attendant that he desires stations S19, S20, and S21 as subordinate parties to a directional conference.

It is to be noted that, as just described, amplifiers 901 and 902 are utilized in tandem for transmission of speech either from or toward the attendant position, and further that as arranged the amplifiers 901 and 902 also comprise a sidetone path for audible sound transmitted from transmitter 151 at attendant position 15.

*2.04 adding station S19 or subordinate station to the conference link*

Upon ascertaining that station S19 is to be added as a subordinate party to the conference, the attendant visually scans the position lamp equipment to determine which trunks are currently idle. At this time lamp L7 is no longer flashing as described earlier, but rather is lighted constantly by virtue of constant negative battery provided on lead L7 of FIG. 5 by operated make contacts 10SZ7–1, thus indicating an established connection. Lamp L8 is, however, extinguished indicating the availability of trunk 8. Accordingly, since S19 is to be connected via the forward horizontal to conference link 3, the attendant depresses nonlocking key FD8.

*2.041 seizure of trunk 8*

As shown on FIG. 5 ground is extended via contact 1 of key FD8, over the KO lead, through 16LR–1, 16PR–1, and the winding of 5KO to operate relay 5KO. As previously described in paragraph 2.02 for trunk 7, relay 5KN operates after a down check of all 5K– relays. Negative battery is thus extended through 5KO–2 operated, 5KN–1 operated, 5K6–2 released, 5K7–2 released, through the winding of 5K8 and then to positive ground via make contacts 2 of key FD8 and operated make contacts 5KO–3. Relay 5K8, therefore, operates at this time.

Referring now to FIGS. 6 and 7, it will be appreciated that for purposes of simplicity trunk 8 is not shown in detail; however, trunk 8 is identical in structure to trunk 7 which is shown in detail. Accordingly, negative battery is extended through 7HM22–1 released, over the RB lead to trunk 8. Since trunk 8 is normal at this time, contacts 10S8–2 are released, and therefore this battery is continuous to controller circuit 16 via lead OS, 5K8–6 operated, 5KO–5 operated, 5BK–1 released, 8AT3–4 operated to operate relay 6FS3 from ground present on the other side of its winding. The closure of make contacts 6FS3–1 operates select magnet 7SM15 in crossbar switch field 17. Turning momentarily to FIG. 2, it will be recognized that select magnet 7SM15 is associated with horizontal 15 which is the forward horizontal of conference link circuit 3. It remains now merely to operate the hold magnet associated with vertical 15 in order to enable crosspoints 15–22.

Returning again to FIGS. 6 and 7, the closure of make contacts 7SM15–1 extends ground over lead ON, through 5K8–12 operated, 7HM22–2 released to operate hold magnet 7HM22. Hold magnet 7HM22 subsequently locks operated through make contacts 7HM22–2, released break contacts 5K8–3, operated make contacts 10S8–8, via lead H through crosspoints 15–22, lead EH, to ground on 16RL3–1 released in controller circuit 16. Having thus operated select magnet 7SM15 and hold magnet 7HM22, crosspoints 15–22 are enabled, thereby connecting trunk 8 independently to a subordinate terminal of conference link 3.

The operation of 7HM22–1 removes battery from lead RB, thereby releasing the previously operated relay 6FS3, which, in turn, releases select magnet 7SM15.

Referring now to FIGS. 9–15, ground is extended through 5K8–6 operated over the PB8 lead from controller circuit 16 to trunk 8, where it is further extended through break contacts 10SZ8–3 released to operate relay 10PB8. The operation of 10PB8 signals the seizure of trunk 8 on a call directed toward the Busch switching system as will be more apparent from the description contained hereinafter.

*2.042 transmitting the called station directory number*

The operation of make contacts 10PB8–2 inserts resistance 802 as a shunt across lead T8 and R8 toward trunk 34 in the Busch system thus alerting trunk 34 and signaling an incoming call as set forth in detail in the Busch disclosure. As further disclosed in Busch, this results in an incoming register of suitable type, such as incoming register 44, being connected to receive the transmitted directory number. In the instant disclosure, the incoming register may advantageously be arranged to receive and register the well-known multifrequency pulsing.

As set forth in detail in the Busch patent, when incoming register 44 is attached to the T8 and R8 conductors, ground is also present on lead S8 which is extended as hereinbefore described to operate relay 10S8. In operating, relay 10S8 completes the obvious operate path of relay 10SZ8 which locks operated through 10S7–3 operated, 10SZ7–10 operated, and 10T7–1 released to negative battery. The operation of relay 10SZ8 completes the transmit and receive paths for trunk 8 through to attendant position 15 via the TT8, TR8, RT8, and RR8 leads, which are extended through 10SZ8–3, 10SZ8–4, and 10SZ8–5 and 10SZ8–6, respectively; crosspoints 15–22, resistances 39, 40, 41, and 42, respectively; to the output of transmit amplifier 902, and the input of receive amplifier 901.

Operated break contacts 10S8–3 cause the release of relay 10PB8 by an obvious circuit. Relay 10PB8 is slow in releasing and therefore a momentary spurt of tone is impressed on the RT8 and RR8 leads toward attendant headset receiver 152 through enabled make contacts 10PB8–3, 10S8–4, and 10PB8–4 and 10S8–5, respectively, to the input of receive amplifier 901 via the previously described circuit path.

The attendant is thus informed that a connection has been established to suitable incoming register equipment in the Busch system and that pulsing of the called directory number may begin. The MFA and MFB leads from multifrequency key set 154 at attendant position 15 are continuous through to the T8 and R8 leads to trunk 34 via operated make contacts 5K8–7 and 5K8–8, respectively. The operator thereupon key pulses the called directory number in the well-known manner.

*2.043 completing the connection to station S19*

As set forth in detail in the Busch patent, incoming register 44 relays the received directory number to marker 42 which thereupon establishes a connection between trunk 34 and station S19 via the crossbar linkage and junctors of trunk link frame 31 and line link frame 30. Ringing takes place in the conventional manner and when the subscriber at station S19 answers, the communication path is complete from station S19 through trunk 34, via the T8 and R8 leads to trunk 8, via hybrid 801 to the TT, TR, RT, and RR leads and thence to attendant position 15 as hereinbefore described.

*2.05 adding stations S20 and S21 as subordinate stations to the conference link*

Upon informing the subscriber at station S19 that he is to be a subordinate party to a directional conference, the attendant proceeds as described hereinbefore in order to add stations S20 and S21 to the conference.

Referring now to FIGS. 1–4, for purposes of explanation we shall assume that trunks 10 and 12 are idle as manifested by the nonlighted condition of lamps L10 and L12, respectively. Thus, proceeding as described hereinbefore for trunk 8, subscriber station S20 may be connected to the forward horizontal of directional conference link 3 via line L20, line link frame 30, trunk link frame 31, trunk 36, the T10, R10, and S10 leads to trunk 10, via vertical 24 and crosspoints 15–24.

In similar fashion station S21 may be connected via trunk 38, trunk 12 and crosspoints 15–26 to the forward horizontal of conference link 3.

*2.06 communication via the established conference connection*

Referring now to FIGS. 9 through 15, the purpose of this immediate section of the specification is to describe the transmission paths which now exist between station S18 as the dominant or controlling station of the conference with respect to stations S19, S20, and S21 which comprise the subordinate parties of the conference. An understanding of this description will be facilitated if it is noted, as summarized in the following table (and described hereinbefore), that a continuous communication path exists from each of the aforesaid stations through line link frame 30, trunk link frame 31, the respectively associated trunks of the Busch embodiment, via the T– and R– conductors to the respective trunks 7, 8, 10, and 12, via the hybrids contained therein to the respectively designated TT–, TR–, RT–, and RR– leads to crossbar switch field 17.

TABLE A

| Station | Busch System Trunk | Two-to-Four Wire Trunk | Transmit and Receive Lead Designations |
|---|---|---|---|
| S18 | 33 | 7 | TT7, TR7, RT7, RR7. |
| S19 | 34 | 8 | TT8, TR8, RT8, RR8. |
| S20 | 36 | 10 | TT10, TR10, RT10, RR10. |
| S21 | 38 | 12 | TT12, TR12, RT12, RR12. |

Thus, the lead designations in the right-hand column of Table A set forth the transmit and receive leads associated with stations S18 through S21, as these leads enter crossbar switch field 17.

The receive leads RT7 and RR7, which are associated with dominant station S18, convey the transmitted speech from that station through crosspoints 14–21, via the crossconnection to punchings RT3 and RR3, resistances 5 and 6, via transmit amplifier 902 forward through respective resistances 11 through 50 to all TT– and TR– punchings, and thence via the respective crossconnections to crosspoints 15–20 through 15–29. However, as described hereinbefore, the only crosspoints of these which are currently enabled are crosspoints 15–22, 15–24, and 15–26. Consequently, transmission from station S18 is effective only toward the associated trunks 8, 10 and 12 via the TT8, TR8; TT10, TR10; and TT12, TR12 leads, respectively.

The audible response from a subordinate station, such as S19, is conveyed via the RT8 and RR8 leads from trunk 8, through enabled crosspoints 15–22, the crossconnections to punchings RT8 and RR8, via resistances 39 and 40, through receive amplifier 901, resistances 7 and 8, the crossconnection to punchings TT3 and TR3, and via the enabled crosspoints 14–21 to the TT7 and TR7 leads of trunk 7. A similar transmit path exists from trunks 10 and 12.

It is to be noted, as just described, that transmission from each subordinate station is effective only toward the dominant station, while transmission from the dominant station is effective toward all subordinate stations.

As will be apparent from the description contained hereinafter, the attendant may remain as a party to the conference or may release from the connection upon establishing the conference.

*2.07 release of attendant position 15 from the established conference connection*

Figure 16:
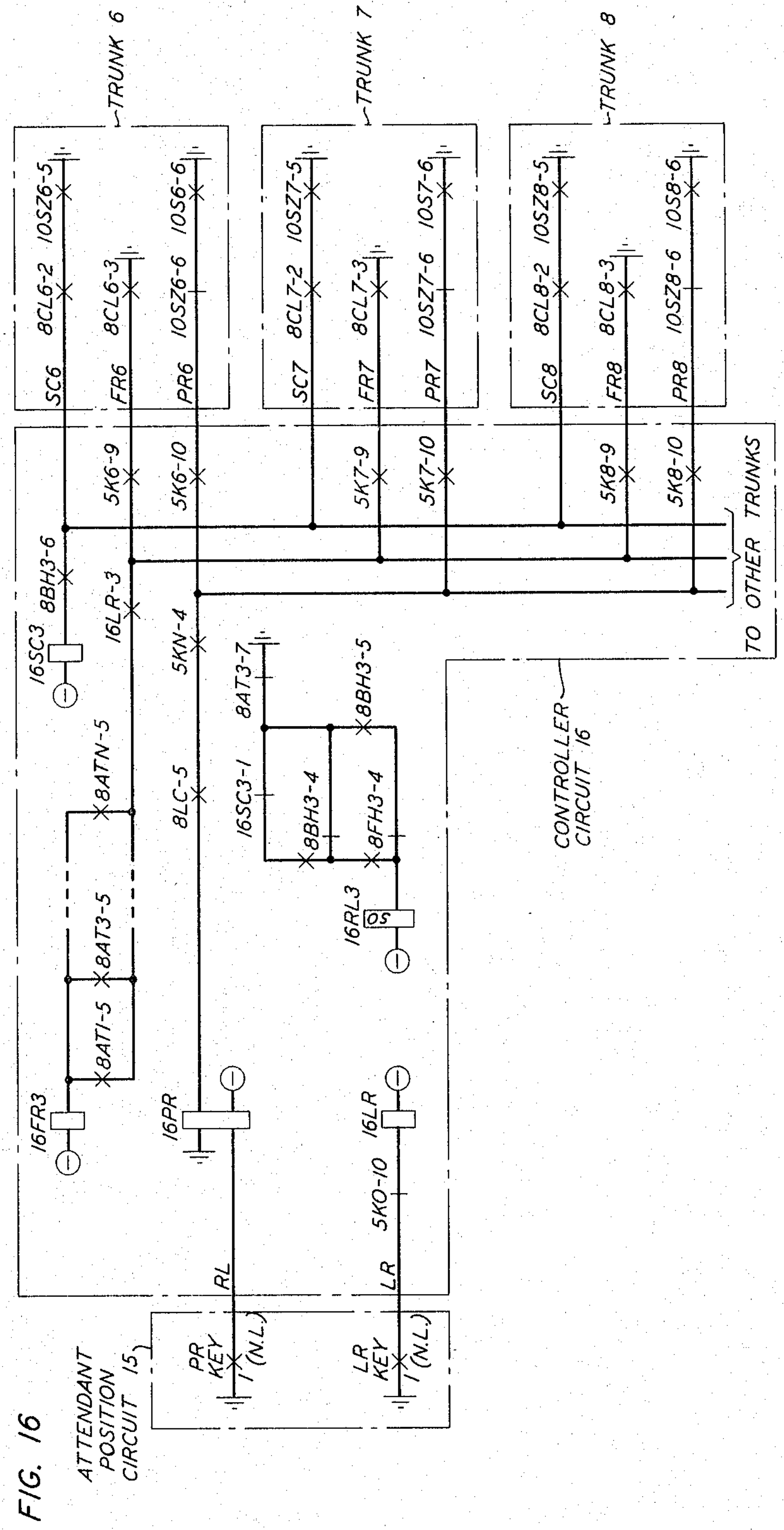

When attendant position 15 releases from an established conference, it may or may not result in returning the associated conference link circuit to normal by releasing all lines from the link. The link may be held by the trunk connected to the backward horizontal if there is also one or more lines connected to the forward horizontal. The purpose of this arrangement is to grant electrical control of the established connection to the dominant station. If, however, the attendant at position 15 releases his position after being connected only to a trunk connected via the backward horizontal or to one or more trunks connected to the forward horizontal, all trunks are released when the position releases as will be apparent from the following:

Referring to FIG. 16, the operation of the position release PR key at attendant position 15 extends ground over lead RL to controller circuit 16 to operate relay 16PR.

As shown on FIG. 8, the operation of break contacts 16PR–2 opens the previously described locking path of relay 8AT3, causing that relay to release. Relay 8AC3 also releases at this time via the release of make contacts 8AT3–2. As shown on FIG. 5, enabled break contacts 16PR–3 restore any operated 5K– relay to normal by opening the previously described operate path of this relay.

Referring now to FIGS. 9 through 15, the release of relay 8AC3 restores the associated make contacts 8AC3–1 through 8AC3–4 to normal thereby opening the transmit and receive paths which extend via leads TT, TR, RT, and RR between attendant position 15 and conference link circuit 3. Attendant position 15 is thus restored to normal and is available to establish other conference connections in a manner similar to that described hereinbefore, or to perform other more conventional attendant functions if the position is so arranged.

Referring again to FIG. 16, as described earlier in establishing the conference connection, relays 8FH3 and 8BH3 are operated to indicate connection of lines to conference link 3 via the forward horizontal and backward horizontal, respectively. Assuming at this point that no lines are currently connected via the forward horizontal, the release of attendant position 15 and the consequent release of break contacts 8AT3–7 as hereinbefore described operates relay 16RL3 by an abvious circuit which extends through released break contacts 8FH3–4 and operated make contacts 8BH3–5 to ground on 8AT3–7.

As shown on FIG. 7, the operation of break contacts 16RL3–1 removes the locking ground which is provided over the OH and EH leads to the operated hold magnets 7HM—, thus releasing the previously operated hold magnet 7HM21. The release of 7HM21–4 opens the operate path of relay 10ST7 thereby releasing it. The release of break contacts 10ST7–1 extends ground through operated make contacts 10SZ7–11 to enable timing circuit 704, which in the well-known manner, operates relay 10T7 after a predetermined interval. The operation of break contacts 10T7–1 opens the previously described locking path of relay 10SZ7, releasing it. Accordingly, make contacts 10SZ7–8 and 10SZ7–9 are restored to normal thereby opening the T and R leads toward the Busch system thus restoring trunk 7 to normal and releasing the terminating connection to station S19 as set forth in the Busch patent.

Referring again to FIG. 16 and assuming that lines are connected to conference link 3 via the forward horizontal but that no trunks are currently associated with the backward horizontal, the operate path of relay 16RL3 then extends through 8FH3–4 operated, 8BH3–4 released to ground present on 8AT3–7 released. In the manner hereinbefore described, the operation of 16RL–1 removes the locking grounds for all hold magnets, thereby releasing them in the same manner as set forth for trunk 7 thus restoring the conference link circuit to normal.

A third situation may exist and that would be as described in the preceding paragraphs 2.00 through 2.06, wherein a completed conference connection has been established and trunks are connected to the conference link via the backward horizontal and forward horizontal. Accordingly, the operate path for relay 16RL3 extends through 8FH3–4 operated, 8BH3–4 operated, 16SC3–1 released, and 8AT3–7 released to ground. However, relay 16RL3 does not operate at this time since break contacts 16SC3–1 are enabled. The operate path of relay 16SC3 extends through 8BH3–6 operated over the SC7 lead to trunk 7, via 8CL7–2 operated and 10SZ7–5 operated to ground. Thus, it is apparent that the release of all operated hold magnets is under control of trunk 7 via relay 16SC3 operated which disables the operate path of relay 16RL3. It is to be noted that the operate path of 16SC3 also extends via the SC8 lead to trunk 8, but is not completed at this time since, as hereinbefore described, make contacts 8CL8–2 are not enabled since trunk 8 is connected via the forward horizontal. The only 8CL– relay which is energized at this time is the one associated with the trunk on the backward horizontal, namely relay 8CL7 of trunk 7. Accordingly, trunk 7, via 8CL7–2, retains electrical supervision of the conference connection. When trunk 7 releases, relay 10SZ7 restores to normal by an obvious circuit and, accordingly, opens the operate path of 16SC3 relay. This, in turn, completes the operate path of relay 16RL3 via released break contacts 16SC3–1 so as to remove the locking ground from all operated hold magnets as hereinbefore described.

*2.08 line release*

As described in paragraph 2.07, it is possible for all associated trunks to be released when the position releases from the link. However, lines may also be released by the attendant position without requiring the attendant position to release from the link. The attendant may release trunks from the forward horizontal individually, or may release all trunks from the forward horizontal simultaneously as follows:

*2.081 individual line release by attendant position 15*

In order to release an individual trunk, the associated 5K– relay must first be operated. Thus, for example, to release trunk 8 the associated FD key is depressed, thereby resulting in the operation of relay 5K8 as hereinbefore described. The operation of make contacts 5K8–3 (not shown but arranged similar to 5K7–3) places the locking path for holding magnet 7HM22 under control of released break contacts 16LR–2.

Referring now to FIG. 16, it will be recognized that the operation of nonlocking key LR completes the obvious operate path of relay 16LR and, accordingly, enables break contact 16LR–2 of FIG. 7, thereby releasing hold magnet 7HM22. The crosspoints in crossbar switch field 17, associated with this hold magnet, are consequently restored to normal, thereby releasing relay 10SZ8 in trunk 8 by opening its operate path which extends through 7HM22–4. The release of make contacts 10SZ8–8 opens the T and R conductors toward the A. J. Busch switching system, thereby restoring the associated trunks to normal in the conventional fashion.

*2.082 group line release by attendant position 15*

In order to simultaneously release all trunks connected to the forward horizontal, the attendant operates the BK– key associated with the trunk connected to the backward horizontal of the conference link. Accordingly, as shown in FIG. 7 and hereinbefore described, it is necessary in order to simultaneously release all hold magnets on the forward horizontal to remove the locking ground which is provided on lead OH to hold magnets 7HM– –.

Referring now to FIG. 16, with the 5K7 relay operated by virtue of the operated BK7 key the attendant depresses the line release key, thereby operating relay 16LR which closes the operate path of relay 16FR3 which extends from negative battery through the winding of relay 16FR3, 8AT3–5 operated, 16LR–3 operated, 5K7–9 operated over the FR7 lead to trunk 7 and then to ground on make contacts 8CL7–3 operated. Accordingly, relay 16FR3 operates and enables break contacts 16FR3–1 to open the OH lead of FIG. 7, thereby restoring all associated operated hold magnets to normal and causing the release of all associated trunks as hereinbefore described. The operated hold magnet associated with the trunk connected to the backward horizontal does not release at this time since an alternate locking path for hold magnets 7HM21 extends through 7HM21–2 operated, 8LC7–1 operated, crosspoints 15–21, to ground on 16RL3–1 released. Thus, at this point the attendant has released all trunks connected to the forward horizontal, but has remained connected to trunk 7 via conference link 3.

*2.083 individual release by subordinate station*

During the course of the conference, subordinate stations may release from the established conference connection without affecting the conference connection. Assuming station S19 returns to an off-hook condition, associated trunk 34 will be released as set forth in detail in the Busch patent, thereby removing ground from the S8 lead which extends to trunk 8; relay 10S8 thereupon releases and restores relay 10SZ8 to normal by an obvious circuit. The release of make contacts 10SZ8–8 and 10SZ8–9 opens the T and R conductors toward the A. J. Busch system and via released make contacts 10SZ8–3 through 10SZ8–6 opens the TT8, TR8, RT8, and RR8 leads, respectively, toward crossbar switch field 17.

Referring now to FIG. 7, it will be seen as shown for hold magnet 7HM21, but equally true for 7HM22, that the release of make contacts 10S8–8 opens the locking path of hold magnet 7HM22 since make contacts 8CL8–1 are not operated in trunk 8. Consequently, the associated crosspoints are released, trunk 8 is restored to normal, and the call may proceed between those stations which remain as parties to the conference.

*2.09 connecting the position to a busy link*

When a position has released from an established conference connection and desires to be reassociated with that conference, it is necessary only to operate the BK– or FD– key associated with any of the trunks involved in that conference connection. Assuming in the instant case that the attendant desires to be reassociated with the conference established via conference link 3, he merely depresses nonlocking key BK7, as hereinbefore described, thereby operating the 5KO, 5KN, and 5K7 relays as also described earlier. However, as shown on FIG. 7, negative battery is not present on the RB lead by virtue of 7HM21–1 operated. Consequently, this potential is not extended via the AS or OS leads so as to cause selection and seizure of another conference link circuit. However, the operate path for relay 8AT3 is closed. The circuit functions which occur subsequent to the operation of relay 8AT3, proceed as hereinbefore described so as to reconnect the attendant position through to conference link 3.

*2.10 adding additional lines to an established conference*

The attendant may add additional lines, such as station SN, to the conference link by proceeding, as described earlier for stations S19, S20 and S21. When the attendant releases the position from the conference link, he may subsequently reassociate himself with the conference link, as described in paragraph 2.09, and, upon so doing, may continue to add additional lines or release lines as set forth in preceding paragraphs.

*2.11 Originating station as subordinate station to the conference*

As described hereinbefore, the station which initially contacts the attendant at position 15 is usually the dominant party to the subsequently established conference connection. However, as will be apparent from the following description, the party initiating the conference connection may remain on the conference connection as a subordinate party, or, in fact, may abandon participation immediately after providing the necessary information to the attendant.

Assuming that station S18 originates the connection to the attendant as set forth in subsection 2.01, upon informing the attendant that station S18 will be a subordinate party in conjunction with stations S20 and S21, for example, and that station S19 will be the dominant party; the attendant merely depresses the PR key at the position and immediately operates the FD7 key. As set forth in subsection 2.07, the operation of key PR releases the trunk, namely, trunk 7, which is connected by the backward horizontal to conference link 3. It will be noted as set forth in subsection 2.07 that relay 10SZ7 is not released pending the operation of relay 10T7, as determined by timing circuit 704. Timing circuit 704 may advantageously be arranged, as well known in the art, to provide a time delay of sufficient interval to enable relay 10SZ7 to remain operated, thus maintaining trunk seizure, until its operate path is again completed by the reoperation of make contacts 7HM21–4 as follows. The operation of key FD7 causes the reselection of directional conference link circuit 3 in the same manner as set forth in subsection 2.01 for the operation of key BK7. The only exception is that relay 5BK does not operate at this time as it did when key BK7 was depressed, since the operation of key FD7 completes only the obvious operate path of relay 5KO. Referring now to FIGS. 6 and 7, it will be seen that negative battery is extended through 7HM21–1 over the RB lead as hereinbefore described via the AS lead through 5K7–2 operated, 5KN–2 operated, 8LC–1 released, 5KO–5 operated, released break contacts 5BK–1, 8LC–2 released, 8LA1–1 operated, 8LA2–1 operated, and through 8LA3–1 released, through the winding of 6FS3 to positive ground. Relay 6FS3 consequently operates and causes the seizure of conference link 3 in the same manner as accomplished previously by the operation of relay 6BS3. Make contacts 6FS3–1 operated extend negative battery via the 7SM15 lead to operate select magnet 7SM15. Ground is extended through 7SM15–1 operated over the ON lead through 5K7–6 operated to operate hold magnet 7HM21.

Referring momentarily to FIGS. 1 through 4, it will be noted that the operation of select magnet 7SM15 followed by the operation of hold magnet 7HM21 closes crosspoints 15–21 which are associated with the forward horizontal of conference link 3.

Turning now to FIGS. 9 through 15, it will be seen, as previously described for trunks 8, 10, and 12, that trunk 7 has a complete transmit and receive path through directional conference link circuit 3 via the T amplifier 902 and R amplifier 901 through to attendant position 15.

Station S19 may now be added to the conference connection in the same manner as previously described for adding station S19 with the exception that the attendant depresses key BK8 in order to do so. Stations S20 and S21 are added to the conference connection exactly as described previously.

Referring now to FIGS. 1 through 4, at this time station S19 is connected to conference link 3 via enabled crosspoints 15–21. Station S20 is connected via enabled crosspoints 15–24 and station S21 is connected via crosspoints 15–26. Thus, the same stations are involved in a conference connection in a manner similar to that described previously with the exception that the originating station S18 is in a subordinate position with respect to station S19.

It is to be noted that station S18 may abandon participation in the conference immediately after informing the operator of the parties to include in the conference or at any point subsequent to so doing. Trunk 7 would thereupon restore to normal as set forth in preceding subsections.

*2.12 conference link connection lamp display*

Figure 17:
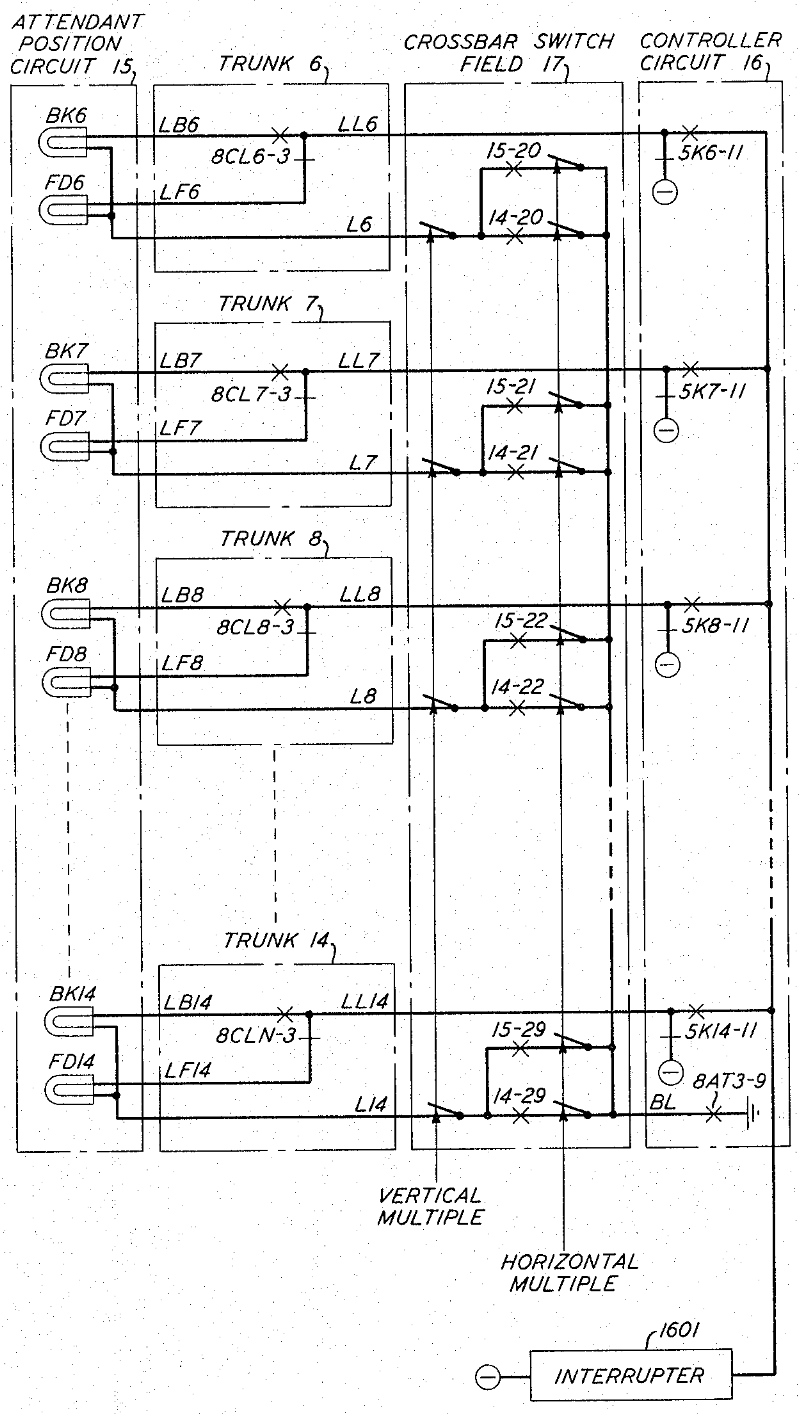

As shown on FIG. 17, attendant position 15 is provided with a backward (BK–) lamp and a forward (FD–) lamp associated with each trunk which appears at the position. Since it may be desirable from time to time for the attendant to rejoin an established conference connection as hereinbefore described and further since this may be accomplished merely by operating any key associated with any line involved in that conference, the attendant position is provided with the aforesaid lamps so as to permit recognition of the trunks involved in a given conference.

Assuming that the attendant has rejoined an established conference connection as set forth in subsection 2.09, the closure of make contacts 8AT3–9 extend positive ground over the BL lead to the backward horizontal multiple of horizontal 14 and forward horizontal multiple of horizontal 15 each of which is exclusively associated with conference link 3. Consequently, this positiev ground is extended through the previously enabled crosspoints 14–21 and 15–22 via the L7 and L8 leads, respectively, to the junction point of lamps BK7, FD7 and BK8, FD8, respectively, at attendant position 15.

As described in preceding paragraphs, trunk 7 is connected to conference link 3 via the backward horizontal. Accordingly relay 8CL7 is operated at this time, thereby completing a path to energize lamp BK7 via 8CL7–3 operated, via the LL7 lead to negative battery on 5K7–11 released. Lamp BK7 is therefore lighted in a steady manner to indicate to the attendant position that trunk 7 is the dominant party in an existing conference connection. We shall assume for purposes of explanation that to reseize conference link 3 the attendant has depressed the key associated with trunk 8. Accordingly, make contacts 5K8–11 would be enabled thus completing the operate path for lamp FD8 which extends via lead LF8 through released break contacts 8CL8–3 via the LL8 lead through 5K8–11 operated to interrupted negative battery provided through interrupter 1601 in controller circuit 16. Lamp FD8 is accordingly operated in a flashing manner, thereby informing the attendant that he has depressed the key associated with that particular trunk of the conference. The FD– lamps associated with trunks 10 and 12 (not shown) would be lighted in a steady manner by virtue of constant negative battery provided through released contacts on relays 5K10 and 5K11, respectively.

When the attendant releases from the conference connection as previously described, the release of make contacts 8AT3–9 restores all lamps to their normally extinguished condition by an obvious circuit.

*2.13 conclusion*

While the equipments of this invention have been described with reference to a particular embodiment in an arrangement whereby the directional conference link circuits and associated crossbar switch field are shown as being associated with subscriber stations via an automatic telephone system, it is to be understood that such an embodiment is intended to be illustrative of the present invention and that numerous other arrangements may be devised by those skilled in the art without departing from the spirit and scope of the invention.

For example, the invention may be employed as a directional conference arrangement for a radio switching system.

Another example would be where the invention is employed as an additional feature of a private branch exchange switchboard wherein the PBX lines have direct access to the crossbar switch field.

Another example would be where the two-to-four-wire trunks of the embodiment are replaced by conventional four-wire trunks accessible via a four-wire toll switching system.

Another example would be where selectively operable means are provided at the attendant position which completely eliminate the ability of the subordinate stations to audibly respond to the dominant party except as determined for selected trunks by the attendant at position 15.

Another example would be where data processing machines are connected as subordinate stations to a conference link to which a central or main computer is connected as a dominant station.

What is claimed is:

1. In a communication system,
selectively operable control means,
a plurality of subscriber lines,
a plurality of conference link circuits,
each of said link circuits comprising a main terminal,
a plurality of subordinate terminals,
means for enabling transmission from a line connected to said main terminal to lines each exclusively connected to distinct ones of said subordinate terminals and for enabling transmission from said lines each exclusively connected to said distinct subordinate terminals only to said line connected to said main terminal.

2. In a communication system, the combination set forth in claim 1 wherein said enabling means further comprises switching means responsive to said selectively operable control means for connecting any of said lines to any of said main terminals and any others of said lines to said subordinate terminals.

3. In a communication system,
a crossbar switch field comprising vertical columns and horizontal rows,
a plurality of trunk circuits each of which is exclusively associated with one of said vertical columns,
a plurality of conference link circuits each comprising a main terminal terminated on a first one of said horizontal rows which is multipled across all of said vertical columns and a plurality of subordinate terminals each of which is exclusively associated with a distinct one of said vertical columns in a second one of said horizontal rows,
an attendant position comprising selectively operable control means, and
switching means responsive to said selectively operable control means for causing said crossbar switch field to connect any one of said trunks to any one of said main terminals and any others of said trunks to any of said subordinate terminals.

4. In a communication system,
a plurality of subscriber stations,
a switching network,
a plurality of two-way trunk circuits,
common control means comprising means responsive to signals from said stations for connecting said stations through said network to said trunk circuits and means responsive to signals through said trunk circuits for connecting said trunk circuits through said network to said stations,
an attendant position,
a plurality of selectively operable nonlocking keys at said position,
a crossbar switch field comprising vertical columns and horizontal rows,
said trunk circuits each exclusively associated with one of said vertical columns,
a plurality of conference link circuits each comprising a main terminal terminated on a first one of said horizontal rows multipled across all said vertical columns,
a plurality of subordinate terminals each exclusively associated with a distinct one of said vertical columns in a second one of said horizontal rows,
switching means responsive to said selectively operable keys for causing said crossbar switch field to connect any one of said trunks to any one of said main terminals and any others of said trunks to any of said subordinate terminals, and
means for enabling transmission from said main terminal to said subordinate terminals and means for enabling transmission from each of said subordinate terminals only to said main terminal.

5. In a telephone system,
a plurality of stations,
a receiver,
a transmitter, and a conference link comprising sidetone means including a receive amplifier and a transmit amplifier connected in tandem via a bridge network and operable to convey transmitted audio signals from said transmitter simultaneously to said receiver and to one of said stations and concurrently operable to convey received audio signals from said station to said receiver.

6. The combination set forth in claim 5 wherein said bridge network comprises two conductors, each of said conductors comprising a capacitor and a resistor connected in series.

7. A conference link circuit comprising a transmit amplifier including a two-conductor input and a two-conductor output, a receive amplifier including a two-conducter input and a two-conductor output, a plurality of four-conductor terminals each comprising a two-conductor transmit path and a two-conductor receive path, each of said conductors comprising a serially connected resistance, means connecting the receive path of a first one of said terminals to the input of said transmit amplifier, means connecting the output of said transmit amplifier in common to the respective conductors of the receive paths of all others of said terminals, means connecting the transmit path of a first one of said terminals to the output of said receive amplifier, and means connecting the input of said receiver in common to the respective conductors of the transmit paths of all other said terminals.

8. The combination set forth in claim 7 and further comprising an attendant position having a two-conductor transmit path and a two-conductor receive path, each of said attendant position conductors including a serially connected resistance, switching means for connecting said attendant position transmit path to the input of said transmit amplifier and for connecting said attendant position receive path to the output of said receive amplifier, and side tone means comprising a two-conductor sidetone path, each of said sidetone path conductors including a serially connected capacitance and resistance and means in said sidetone path for connecting the output of said transmit amplifier to the input of said receive amplifier.

9. In a communication system, an attendant position, selectively operable control means at said position, a plurality of two-way trunks, a plurality of conference link circuits, each of said link circuits comprising a main terminal and a plurality of subordinate terminals, and switching means responsive to said selectively operable control means for connecting said attendant position and a calling one of said trunks to one of said main terminals.

10. In a communication system, an attendant position, selectively operable control means, a plurality of two-way trunks, a plurality of conference link circuits, each of said link circuits comprising a main terminal, a plurality of subordinate terminals, means for enabling transmission from a trunk connected to said main terminal to trunks each exclusively connected to said subordinate terminals and means for enabling transmission from trunks each exclusively connected to said subordinate terminals only to the trunk connected to said main terminal, and switching means responsive to said selectively operable control means for connecting said attendant position and a calling one of said trunks to any one of said conference link main terminals.

11. In a communication system, an attendant position, selectively operable control means, a plurality of two-way trunks, a plurality of conference link circuits, each of said link circuits comprising a main terminal and a plurality of subordinate terminals, switching means responsive to said selectively operable control means for connecting said attendant position and a calling one of said trunks to any one of said conference link main terminals, and means for connecting any others of said trunks to said conference link subordinate terminals.

12. In a communication system, the combination set forth in claim 11 wherein each of said conference link circuits further comprises means for enabling transmission from a trunk connected to said main terminal to trunks each exclusively connected to said subordinate terminals and means for enabling transmission from trunks each exclusively connected to said subordinate terminals only to the trunk connected to said main terminal.

13. In a communication system, the combination set forth in claim 11 further comprising an attendant position and wherein said switching means further comprises means responsive to said selectively operable control means for releasing said attendant position from said main terminal.

14. In a communication system, the combination set forth in claim 13 wherein said switching means further comprises means responsive to said selectively operable control means for reconnecting said attendant position to said main terminal.

15. In a communication system the combination set forth in claim 11 wherein said switching means further comprises means responsive to said selectively operable control means for individually releasing the connection of any of said other trunks from said subordinate terminals.

16. The combination set forth in claim 11 wherein said switching means further comprises means responsive to said selectively operable control means for simultaneously releasing the connection of all of said other trunks from said subordinate terminals.

17. In a communication system, a plurality of stations, a switching network, a plurality of two-way trunk circuits, common control means comprising means responsive to signals from said stations for connecting said stations through said network to said trunk circuits and means responsive to signals through said trunk circuits for connecting said trunk circuits through said network to said stations, an attendant position, a plurality of selectively operable nonlocking keys at said position each exclusively associated with one of said trunks, a plurality of conference link circuits, each of said link circuits comprising a main terminal and a plurality of subordinate terminals, and switching means responsive to said selectively operable nonlocking keys for connecting any one of said trunks to any one of said main terminals and any others of said trunks to any of said subordinate terminals.

18. The combination set forth in claim 17 wherein said attendant position further includes link display means for manifesting the identity of the trunk connected to a conference link main terminal and the identities of each of the trunks connected to said conference link subordinate terminals.

19. The combination set forth in claim 18 wherein said link display means comprises means for enabling said manifestation in response to the momentary operation of any one of said selectively operable keys associated with any trunk connected to said conference link.

20. The combination set forth in claim 19 wherein said link display means further comprises means for continuously manifesting the identity of the trunk associated with said momentarily operated selectively operable key.

References Cited by the Examiner

UNITED STATES PATENTS 3,133,994 5/1964 Zarouni ---------- 179—18.01

KATHLEEN H. CLAFFY, *Primary Examiner.*

WILLIAM C. COOPER, *Examiner.*